(12) United States Patent
Lin et al.

(10) Patent No.: US 10,964,684 B2
(45) Date of Patent: Mar. 30, 2021

(54) MULTIPLE FIN HEIGHT INTEGRATED CIRCUIT

(71) Applicant: TAIWAN SEMICONDUCTOR MANUFACTURING COMPANY, LTD., Hsinchu (TW)

(72) Inventors: Wei-Cheng Lin, Taichung (TW); Hui-Ting Yang, Zhubei (TW); Jiann-Tyng Tzeng, Hsinchu (TW); Lipen Yuan, Jhubei (TW); Wei-An Lai, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/405,898

(22) Filed: May 7, 2019

(65) Prior Publication Data
US 2020/0006318 A1 Jan. 2, 2020

Related U.S. Application Data

(60) Provisional application No. 62/692,409, filed on Jun. 29, 2018.

(51) Int. Cl.
| | |
|---|---|
| H01L 21/336 | (2006.01) |
| H01L 27/02 | (2006.01) |
| H01L 27/088 | (2006.01) |
| H01L 29/78 | (2006.01) |
| H01L 29/10 | (2006.01) |
| H01L 21/8234 | (2006.01) |
| G06F 30/39 | (2020.01) |

(52) U.S. Cl.
CPC .......... *H01L 27/0207* (2013.01); *G06F 30/39* (2020.01); *H01L 21/823431* (2013.01); *H01L 27/0886* (2013.01); *H01L 29/1033* (2013.01); *H01L 29/7851* (2013.01)

(58) Field of Classification Search
CPC ............. H01L 27/0207; H01L 27/0886; H01L 29/7851; H01L 29/1033; H01L 21/823431; G06F 30/39; G06F 2119/06
See application file for complete search history.

(56) References Cited

U.S. PATENT DOCUMENTS

2020/0235013 A1* 7/2020 Lilak .................... H01L 21/8221
2020/0312846 A1* 10/2020 Rachmady .......... H01L 21/8252

* cited by examiner

*Primary Examiner* — Ismail A Muse
(74) *Attorney, Agent, or Firm* — Hauptman Ham, LLP

(57) ABSTRACT

A method of modifying an integrated circuit includes operations related to identifying at least two fin-containing functional areas of the integrated circuit, generating a performance curve for each fin-containing functional area of the integrated circuit for each fin height of a series of fin heights, and determining whether an inflection point exists for each performance curve. The method further includes operations related to selecting a value of a performance characteristic for each of the fin-containing functional areas, the selected value having a corresponding fin height in each of the fin-containing functional areas, modifying each fin-containing functional area to have the fin height corresponding to the selected value of the performance characteristic; and combining the modified fin-containing functional areas to form a modified integrated circuit.

19 Claims, 16 Drawing Sheets

400

| Design block<br>(Types of Standard Cells) | Standard Cell Library | Fin height |
|---|---|---|
| High Density Standard Cells | Low fin # Library<br>(1 fin per standard cell) | Tall fins |
| Medium Density Standard Cells<br>(balance power and performance) | Medium fin # Library<br>(2 fins per standard cell) | Medium fins |
| High Performance / Low Density | High fin # Library<br>(3 or more fins per standard cell) | Short fins |

MULTIPLE FIN HEIGHT INTEGRATED CIRCUIT

BACKGROUND

Integrated circuit (IC) manufacturing includes steps designed to regulate the functionality of an integrated circuit. Some steps for regulating functionality occur in the design phase of the integrated circuit. Some steps occur during manufacturing of the integrated circuit. Design phases of an integrated circuit manufacturing process relate to arranging features on an integrated circuit and selecting processing parameters for individual structural features of an integrated circuit in a manufacturing process. Manufacturing phases of the integrated circuit relate to performing steps selected during a design phase of the IC manufacturing process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 is a table of conductance parameters of an integrated circuit, in accordance with some embodiments.

DETAILED DESCRIPTION

Figure 1:
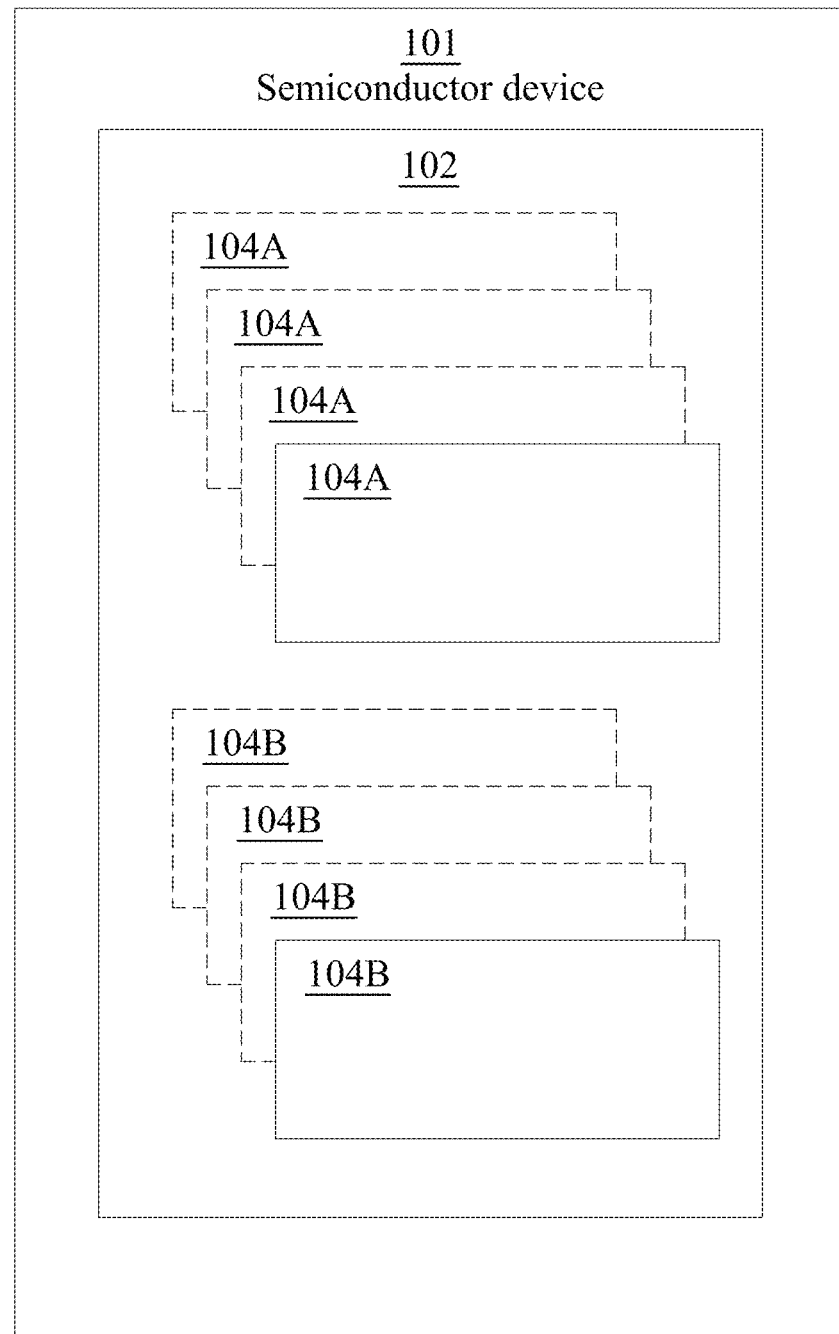
FIG. 1 is a block diagram of a semiconductor device, in accordance with at least one embodiment.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, reference numerals and/or letters in the various examples to simplify the description. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Integrated circuit (IC) operation is evaluated in terms of performance characteristics of the IC. In some embodiments, IC users use and deploy integrated circuits based on the values of performance characteristics of the ICs. One performance characteristic of an IC is power consumption of the integrated circuit at an IC operating voltage. Another performance characteristic of an IC is the processor speed of the IC at an operating voltage. An integrated circuit consumes more power and has a faster overall processor speed at a higher operating voltage than at a lower operating voltage.

Performance of an IC is evaluated using a performance chart. A performance chart includes one or more performance curves reflecting modeled and/or measured performance characteristics, or operating results, of an IC. A single performance curve reflects a change in the integrated circuit operating result as only one contributing element is modified. In some cases, the contributing element is an operating parameter setpoint. In some cases, the operating parameter setpoint is operating voltage of the integrated circuit. In some cases, the operating parameter setpoint is a cooling rate, although other operating parameter setpoints are also envisioned within the scope of the present disclosure. In some cases, the contributing element is a structural property of the integrated circuit. In some embodiments, the structural property is related to resistance within the integrated circuit. In some embodiments, the structural property is related to the composition of a material in the integrated circuit. In some embodiments, the structural property is related to a dimension of a feature of the integrated circuit. In some cases, the dimension of the feature relates to a channel dimension and/or a gate electrode dimension. Other non-limiting examples of contributing elements that are varied to generate performance charts of an integrated circuit include dopant concentrations, implant energies, implant profiles, types of substrate material, types of channel material, interface composition at IC interconnects, and dimensions of elements of a semiconductor cell are other types of structural elements that relate to IC performance. Integrated circuits with different design, dimensions, doping characteristics, and/or other physical properties have distinct performance curves.

FIG. 1 is a block diagram of a semiconductor device 100, in accordance with at least one embodiment. In FIG. 1, semiconductor device 100 includes, among other things, a circuit macro (hereinafter, macro) 102. In some embodiments, macro 102 is a transistor macro. In some embodiments, macro 102 is a macro other than a transistor macro. In some embodiments, macro 102 is an interconnection structure macro. Macro 102 includes, among other things, one or more standard-cell-adapted FinFET arrangements 104A. In some embodiments, macro 102 includes a plurality of interconnection wires on a same level of an integrated circuit. In some embodiments, macro 102 includes, among other things, one or more arrangements 104A and one or more arrangements 104B. In some embodiments where one or more arrangements 104A and one or more arrangements 104B are included, arrangement 104A differs from arrangement 104B.

Integrated circuits include cells, or groups of circuit components that are configured to perform predetermined circuit functions. Examples of such integrated circuit functions include receiving signals, sending signals, communication between components of an IC and on other ICs, storing data, performing calculations, and managing IC functionality (memory controllers, IC timing circuit elements, and so forth). Groups of circuit components may be pre-configured as standard cells that are arranged in an integrated circuit layout process prior to an integrated circuit manufacturing process. Standard cells facilitate simplified circuit performance simulation using the predetermined blocks, or standard cells, of the circuit design. Some embodiments of standard cell libraries include purely digital circuit components. Some embodiments of standard cell libraries include purely analog circuit components. Some standard cell libraries include mixtures of digital and analog circuit components configured to work together in a single integrated circuit.

Integrated circuit manufacturing involves using standard cells in cell libraries to simplify a design process for integrated circuits. In some embodiments, simplified design processes using standard cells in libraries limits a manufacturer's ability to maximize circuit component density of an integrated circuit. Standard cells have a standard cell length in a first direction and a standard cell width in a second direction (different from the first direction) so that cell borders of adjoining cells align. In some embodiments, integrated circuits contain wires that connect cells, on one level of the circuit, with other cells of the integrated circuit. In some embodiments, the second direction is perpendicular to the first direction. The wires of an integrated circuit interconnection structure are oriented along the first direction, the second direction, or a third direction different from the first and second directions. Some cells of integrated circuits contain arrays of interconnection wires. In some embodiments, wires are positioned at regularly spaced positions in an array of wires. In some embodiments, a cell having an array of wires is completely populated by wires (e.g., each position of the array of wires has a wire located thereon). In some embodiments, an array of wires is incompletely populated (e.g., one or more positions of an array of wires is free of a wire). Widths of wires in an array of wires, or individual wires, of an integrated circuit are adjusted in a layout of an integrated circuit, to produce preconfigured layouts with predictable and consistent performance and known levels of interference with other parts of an integrated circuit. Integrated circuit design aims to reduce interference, and to maintain performance of circuit elements within desired parameters. To preserve performance characteristics of the cells within anticipated ranges in completed circuits, some wires of an array of wires are broadened (e.g., widened, or spread) in order to reduce a likelihood of circuit-destroying defects in a manufacturing process.

In some embodiments, subsets of transistors in an integrated circuit that are candidates for height adjustment are identifiable according to a function and/or a structural factor of the transistors in the subsets. In some embodiments, an amount of a height adjustment is related to the function of the transistor and/or structural factor of the transistors in the subset. In some embodiments, fastest switching speeds of cells in an IC are related to the function of the cells, such as: a system on a chip (SoC) components, central processing (CPU) components, and/or graphics processing unit (GPU) components, or other components associated with generating graphical output. The switching speed of FinFETs in different types of circuit components is a function of fin height and a number of fins, among other circuit design components. In some embodiments, fins of a system on a chip (SoC) have a fastest switching speed for tall fin heights. In some embodiments, fins of a CPU have a fastest switching speed for intermediate fin heights of a range of fin heights. In some embodiments, a GPU component has a fastest switching speed for fin heights between the fin heights of SoC and CPU components. According to some embodiments, fin heights of an integrated circuit ranges from about 5 to about 100 nanometers (nm). In a non-limiting example of a divided integrated circuit, cells of the integrated circuit are divided into a first set of cells includes the cells of the central processing unit (CPU), a second set of cells includes the cells of an integrated graphical processing unit (GPU) of the IC, and a third set of cells includes a system on a chip (SoC) that regulates performance of the IC. In some embodiments, fin-containing functional areas (or, fin containing areas, or active areas, or design blocks) of an integrated circuit are contained on a single substrate. In some embodiments, the fin containing-functional areas of an integrated circuit are formed on separate substrates and combined into a three-dimensional integrated circuit by, e.g., laminating circuit portions together and electrically connecting the circuit portions with through-substrate vias filled with metal or another conductive material. In some embodiments, circuit portions of a three-dimensional integrated circuit are arranged according to a function of the functional areas on each of the circuit portions, such as memory or storage on one circuit portion, graphics/rendering portions on a second portion, and logic functions on a third circuit portion.

In some embodiments, cells of an integrated circuit are divided according to a number of fins of the FinFETs thereof. In a non-limiting example of a divided integrated circuit, a first set of cells has FinFETs with a single fin (e.g. high performance cells), a second set of cells has an intermediate number of fins (e.g., FinFETs with 2-3 fins), and a third set of cells has a greater number of fins (e.g., FinFETs with at least three fins). In other non-limiting examples of dividing cells, or transistors, into subsets, transistors and/or cells are assigned into subsets based on cell functions. Assignment of cells is not exclusively based on the number of fins in the cells: some cells having a first number of fins are in a first set, and some cells having the same number of fins are in a second set, based on an anticipated switching speed specification of the cells, and/or another criterion. Some criteria for allocating cells into groups includes cell function, cell speed specifications, position of a cell on a substrate when fabricating an integrated circuit, and so forth.

In some embodiments, cells having different numbers of fins, or a same number of fins with a different switching speed specification, are allocated into a same group of fins to evaluate the effect of fin height tailoring on overall integrated circuit performance. In some embodiments, a number of fins is increased in order to evaluate performance of the integrated circuit. In some embodiments, a number of fins is decreased in order to evaluate performance of the integrated circuit.

Figure 2:
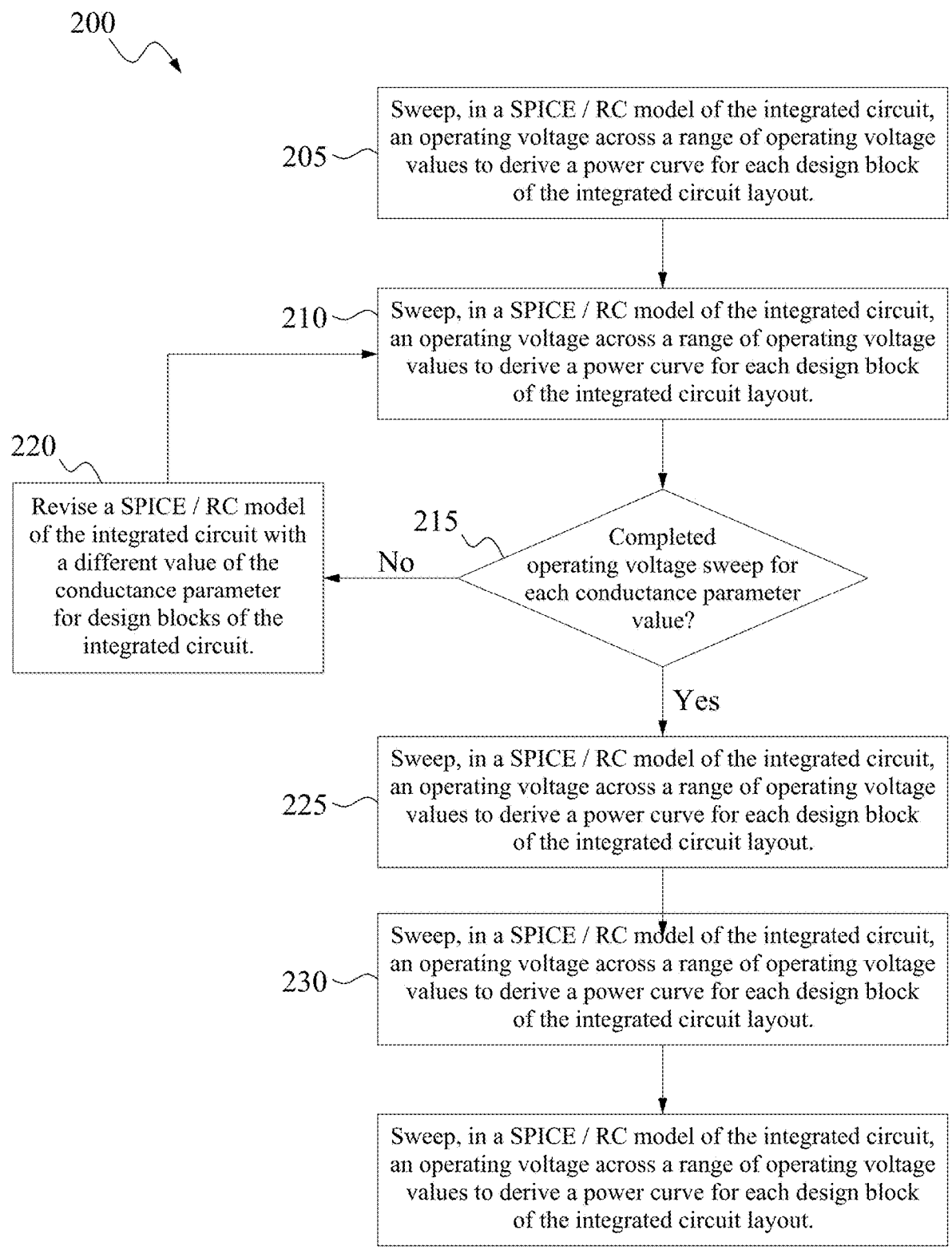
FIG. 2 is a flow diagram of a method of making an integrated circuit, according to some embodiments.

FIG. 2 is a flow diagram of a method 200 of making an integrated circuit, in accordance with some embodiments. A conductance parameter is a feature of an integrated circuit which impacts or regulates the amount of current that flows through a cell of an integrated circuit. Conductance parameters of FinFETs include at least fin height, fin width, fin cross-section, and the number of fins in a cell of the integrated circuit. Each conductance parameter of a FinFET has a range of values. When integrated circuits contain cells, or FinFETs, having one of these values of the conductance parameter, the performance characteristics (e.g. switching speed, or power consumption) of the integrated circuit are different than the performance characteristics of an integrated circuit having a different value of the conductance parameter. Values of conductance parameters are evaluated in circuit design processes to select final values for the conductance parameters in a manufacturing process for the integrated circuit.

Method 200 includes an operation 205, in which an initial value for a conductance parameter of design blocks of an integrated circuit is selected for evaluating the performance of the integrated circuit. The initial value of the conductance parameter is selected from a range of values of the conductance parameter. In some embodiments, the conductance parameter is the number of fins in a cell of the integrated circuit. In some embodiments, the conductance parameter is the height of the doped regions of the fins in the integrated circuit cell. In some embodiments, the conductance parameter is the width of the fins of a set of cells of the integrated circuit. In some embodiments, the conductance parameter is the cross section of the fin (e.g., a combination of both fin height and fin width). According to some embodiments, the initial value for the conductance parameter is a largest value of the conductance parameter of a range of conductance parameter values for the integrated circuit during a design process of the integrated circuit.

Method 200 includes an operation 210, wherein in a SPICE/RC model of the integrated circuit, the performance of the integrated circuit is modeled to derive a power curve or a performance curve of the integrated circuit. In some embodiments, the performance of the integrated circuit is evaluated on a design block by design block basis. In some embodiments, the performance of the integrated circuit is evaluated on a cell by cell basis. In some embodiments, the performance curve of the integrated circuit as a whole is determined by combining the performance of individual, or groups of, design blocks or cells of the integrated circuit.

Method 200 includes an operation 215, wherein a determination is made as to whether each value of the conductance parameter has been evaluated in SPICE/RC modeling of the integrated circuit. When less than the full range of the conductance parameter values has been evaluated by SPICE/RC modelling, the method continues to operation 220. When the full range of the conductance parameter values has been evaluated by SPICE/RC modeling, the method continues to operation 225.

Method 200 includes an operation 220, wherein the spice/RC model of the integrated circuit is modified to have a different value of the conductance parameter than the initial value of the conductance parameter. When the different value of the conductance parameter is included in a modified value of the conductance parameter, the method continues to operation 210.

Method 200 includes an operation 230, wherein, for each design block of the integrated circuit, the performance curve is evaluated in order to identify a value of the conductance parameter and a value of the operating voltage of the integrated circuit which, in the SPICE/RC model of the integrated circuit, has a desired performance characteristic. In some embodiments, the desired performance characteristic is a lowest power consumption. In some embodiments, the lowest power consumption is selected without reducing the operating voltage of the integrated circuit below a threshold value. In some embodiments, the threshold value of the operating voltage is an operating voltage of the integrated circuit that corresponds to a lowest power consumption value of the operating voltage for a different set of cells or design blocks. In some embodiments, the overall performance of an integrated circuit is improved based on method 200 by selecting different values of the conductance parameter for different design blocks or cells of the integrated circuit.

Method 200 includes an operation 235, wherein, using the conductance parameters selected for the integrated circuit, the integrated circuit is manufactured according to processes and operations that produce, in the integrated circuit, the conductance parameters selected for the integrated circuit.

Figure 3:
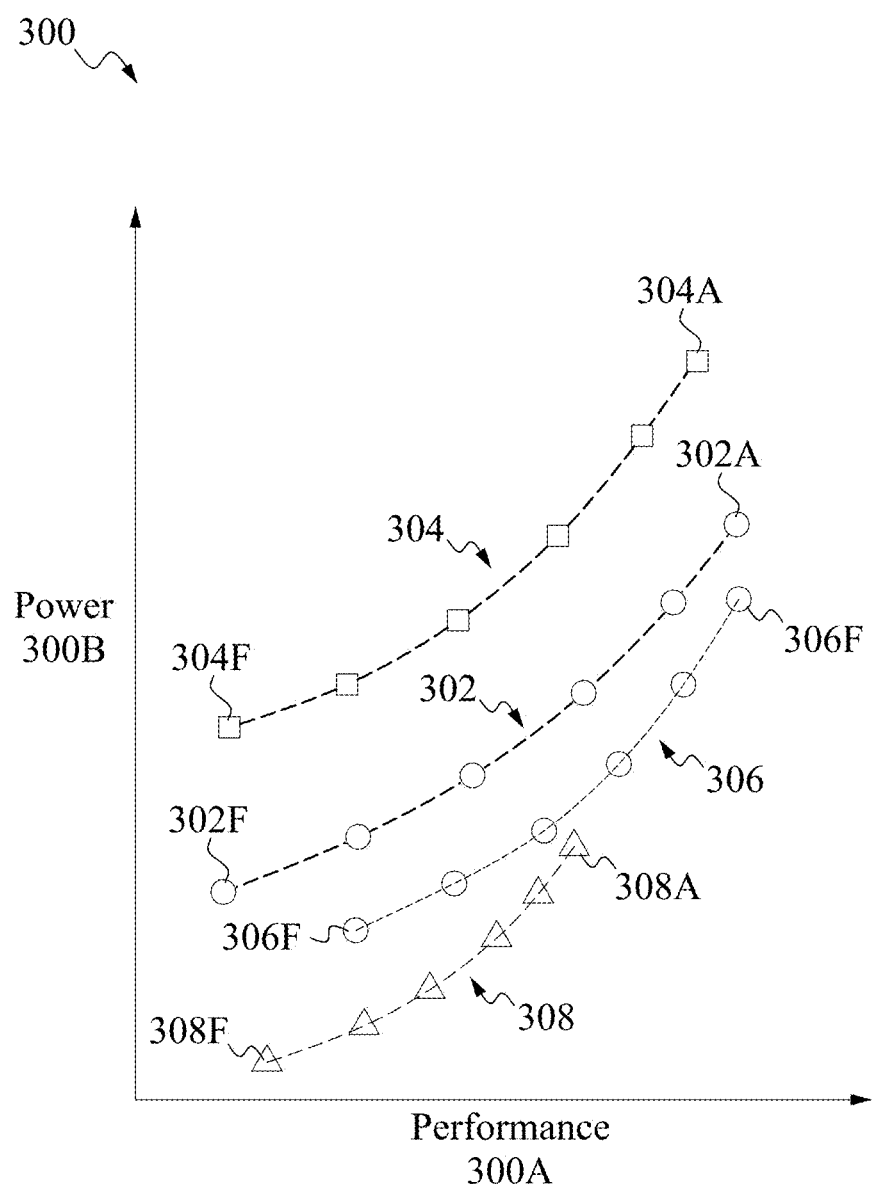
FIG. 3 is a performance chart of an integrated circuit, in accordance with some embodiments.

FIG. 3 is a performance chart 300 of an integrated circuit, in accordance with some embodiments. Performance chart 300 has a first axis 300A representing clock speed of integrated circuit 301, and a second axis 300B representing power consumption of the integrated circuit 301. Performance chart 300 includes performance points representing a power consumption and switching performance of the entire integrated circuit, or of a subset of cells of the integrated circuit, at a setpoint of the operating voltage of the integrated circuit 301. A performance curve is a set of performance points representing the power consumption/switching performance of the entire integrated circuit, or of a subset of cells of the integrated circuit, over a range of operating voltage setpoints of the integrated circuit.

Performance curve 302 is a performance curve of all cells of integrated circuit 301. Performance curve 304 is a performance curve of a first subset of cells, performance curve 306 is a performance curve of a second subset of cells, and 308 is a performance curve of a third subset of cells of the integrated circuit. On performance chart 300, the different positions of performance curves 304, 306, and 308, with respect to performance curve 302, indicate that the switching speeds, or clock speeds, of the three subsets of cells, are different over a range of operating voltages. Performance points 304A, 306A, and 308A indicate that, at a largest operating voltage, the transistors in the first subset of cells (see performance point 304A) have a clock speed roughly comparable to the transistors in the second subset of cells (see performance point 306A), but consume more power than the transistors in the second subset of cells. Further, the transistors in the third subset of cells consume less power (see performance point 308A) than those in the first and second subsets of cells, but have typically slower clock speed than the transistors in both the first subset of cells and second subset of cells.

An integrated circuit characteristic is different for each of the first, second, and third subsets of cells. According to some embodiments, the integrated circuit characteristic is a number of fins of transistors in cells of the subgroups. In some embodiments, the integrated circuit characteristic is the functional block type of the cells of the subgroups (e.g., Central Processing Unit (CPU), Graphics Processing Unit (GPU), System on a Chip (SoC), and so forth). In some embodiments, the integrated circuit characteristics is the IP block of the cells in the subgroups. In FIG. 3, the fins of the three subsets of cells which generate performance curves 304, 306, and 308 have the same fin height. In performance chart 300, the different performance curves 304, 306, and 308 reflect the differences associated with different numbers of fins in the cells of each of the subsets of cells of the integrated circuit. In a non-limiting embodiment, the transistors of cells in the third subset of cells have a first (lowest) number of fins, the transistors of cells in the first subset or cells have a third (largest) number of fins, and the transistors in the second subset of cells have a second number of fins, where the second number is larger than the first number, and smaller than the third number of fins. In a non-limiting embodiment, the cells in the first subset of cells contain transistors for a central processing unit (CPU), the cells in the second subset of cells contain transistors for a graphics processing unit (GPU), and the cells in the third subset of cells contain transistors for a circuit control function such as memory management. The performance curve 302 is a combination of the performance curves of all the subsets of cells of the integrated circuit 301, including the first subset of cells, the second subset of cells, and the third subset of cells.

In some embodiments, the current-carrying capacity ("carrying capacity") of a cell in an integrated circuit is related to the fin height and the number of fins of transistors in the cell. By adjusting a dimension of the fin, the carrying capacity of the fin is also adjusted. For example, reducing a fin height of a transistor reduces the carrying capacity of a transistor. Thus, by reducing a dimension of many fins in the integrated circuit, the performance curve of a subset of cells is altered, and the performance curve of the entire integrated circuit is also altered, to a lesser degree. A description of altering a performance curve of a subset of cells follows in the description of FIG. 3. When a performance curve of an entire integrated circuit is modified by adjusting fin dimensions of some, or all, of the transistor fins therein, the switching performance of an integrated circuit is maintained at least a level corresponding to the level without fin dimension adjustment, but with a lower power consumption.

FIG. 3 is a performance chart 300 of an integrated circuit, according to some embodiments. Performance chart 300 includes a performance curve 302 including performance points 302A-302F. A first axis 300A of performance chart 300 represents a measured or simulated clock speed or switching speed of the integrated circuit for an operating voltage setpoint. A second axis 300B of performance chart 300 represents a measured or simulated power consumption of the integrated circuit for an operating voltage setpoint. Performance points (or evaluation points) are positioned on a performance chart at a coordinate corresponding to the switching speed of a set of cells of the integrated circuit on first axis 300A, and the power consumption of the set of cells on the second axis 300B. For a single performance curve, whether for a subset of the cells of an integrated circuit, or for the entire set of cells of the integrated circuit, the different performance points (or, evaluation points, when the performance is being modeled) correspond to power/performance measurements/simulations for different operating voltages of the integrated circuit.

Performance points 302A-F of performance curve 302 reflect different operating results (power consumption versus switching speed) of the integrated circuit as a whole, for a range of operating voltages of the integrated circuit. Performance curves 304, 306, and 308 represent the operating results (power consumption versus switching speed) of subsets of cells, or design blocks, of the integrated circuit. Performance curve 304 represents a set of operating results of a first subset of cells of the integrated circuit, with high power consumption compared to the second subset of cells, with operating results represented by performance curve 306, and the third subset of cells, with operating results represented by performance curve 308. Performance curve 304 includes performance points 304A-F, performance curve 306 includes performance points 306A-F, and performance curve 308 includes performance points 308A-F. A same letter at the end of a performance point identifier indicates that the performance point, or operating result, is obtained based on a same value of the operating voltage of the integrated circuit. In some embodiments, performance points are measured after a manufacturing process using electronic testing equipment. In some embodiments, performance points are calculated in a modeling environment for the integrated circuit, such as SPICE/RC modeling environments. The performance curves 304, 306, and 308 reveal that subsets of the cells or design blocks of the integrated circuit have different power consumption and switching speed characteristics. While improvement of an integrated circuit performance is sometimes accomplished by modifying conductance parameters similarly across an entirety of the integrated circuit, in some embodiments, the performance of subsets of the cells or design blocks of an integrated circuit is accomplished piecemeal. Piecemeal modification of the integrated circuit design is accomplished by performing different modifications to fin design or shape in different subsets to improve each subset of cells of the integrated circuit independently.

In some embodiments, operating results or performance characteristics of a first subset of cells or design blocks of the integrated circuit is modified by adjusting a fin dimension (fin height, fin width, or fin cross section), and operating results of a second subset of cells of the integrated circuit is also modified by adjusting a fin dimension (fin height, fin width, or fin cross section). In some embodiments, operating results or performance characteristics of a first subset of cells or design blocks of the integrated circuit is modified by adjusting a fin dimension (fin height, fin width, or fin cross section), and operating results of the second subset of cells of the integrated circuit are adjusted by modifying a number of fins in the cells or design blocks of the integrated circuit. FIG. 4 is a table 400 of conductance parameters of an integrated circuit, in accordance with some embodiments of the present disclosure. According to some embodiments, conductance parameters of shown in table 400 are modified independently in different subsets of the cells or design blocks of the integrated circuit in order to modify power consumption of an integrated circuit. According to some embodiments, performance and/or power consumption of one subset of cells of the integrated is adjusted by modifying more than one conductance parameter of the integrated circuit at a same time (e.g., during a SPICE/RC modeling process for the integrated circuit) to further evaluate the combinatory effect of conductance parameter adjustment on power consumption or performance of the integrated circuit.

Decreasing power consumption of integrated circuits helps to increase battery life of portable computing devices, or to decrease power consumption (and waste heat produced by) non-portable devices. Decreased waste heat production reduces the cost of cooling facilities with large numbers of servers or processors doing computational work. Increased battery life of portable computing devices reduces the frequency with which the device is recharged to perform the intended device function. In some embodiments, the maximum operating voltage setpoint is determined by the breakdown characteristics of the IC being tested. In some embodiments, voltage setpoints are as great as 20V. In a non-limiting embodiment, the voltage setpoints are as low as 1V. The series of performance curves is generated by repeating the process of forming a single performance curve for discrete values of the second contributing element.

On performance chart 300, the performance points across multiple performance curves are grouped to form trend lines that reflect shifts in operating results of the IC. An inflection point is an intersection between two trend lines that reflects a "best" operating result of the IC, according to the performance parameters used to define the axes, and the conductance parameters used to generate the performance chart. The inflection point of a performance curve reflects a point on the performance curve where the subset of cells of the integrated circuit (or, the circuit as a whole) becomes more sensitive to modifying the circuit.

Figure 5:
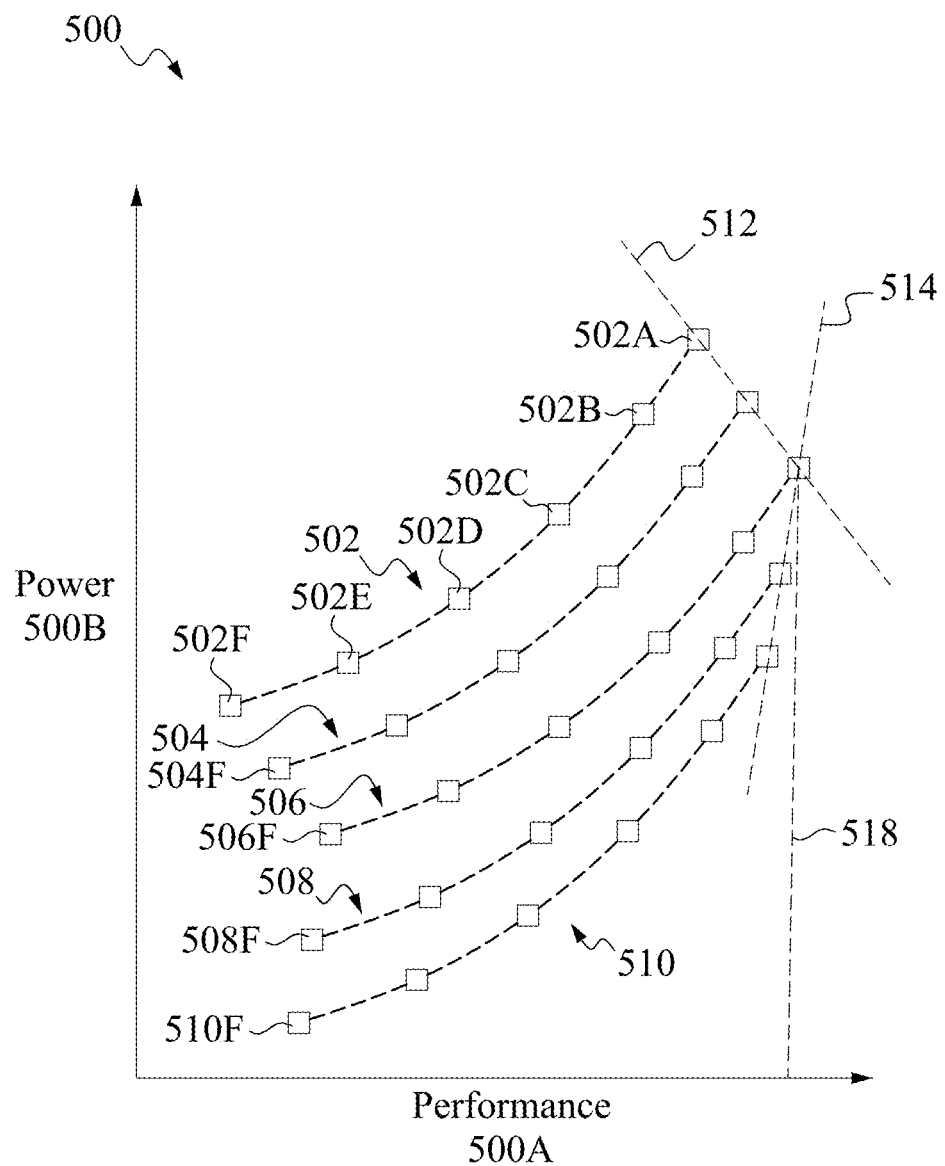
FIG. 5 is a performance chart of a set of design blocks of an integrated circuit, in accordance with some embodiments.

FIG. 5 is a performance chart 500 of integrated circuit 301 (not shown), reflecting modification of a single conductance parameter of a subset of cells of the integrated circuit across a range of conductance parameter values, in accordance with some embodiments. First axis 500A corresponds to values of switching speed, or performance, of the subset of cells of the integrated circuit. Second axis 500B corresponds to values of power consumption of the subset of cells of the integrated circuit. Performance curves 502, 504, 506, 508, and 510 correspond to measured (after manufacturing of an integrated circuit) or calculated (in a SPICE/RC model) behavior of the subset of cells of the integrated circuit for different values of a conductance parameter. As described above, the conductance parameter includes at least fin height, fin width, and fin cross section (a combination of fin height and width. Performance point identifiers end with a letter. The letter corresponds to a value of the operating voltage of the integrated circuit for the measurement or calculation of the performance point. Performance points having a same terminal letter are measured or calculated using a same operating voltage. First trend line segment 512 corresponds to values of the conductance parameter, for a single value of the operating voltage, that are positively sensitive with regard to both power consumption and performance (e.g., power consumption decreases, and performance does not decrease). Second trend line segment 514 corresponds to values of the conductance parameter, for the same single value of the operating voltage, that have positive sensitivity of power consumption to changes in the conductance parameter value, but negative sensitivity of performance or switching speed, for the changes to the conductance parameter. Line 518 indicates the value of the conductance parameter and the operating voltage setpoint which results in peak performance of the subset of cells of the integrated circuit.

Figure 6:
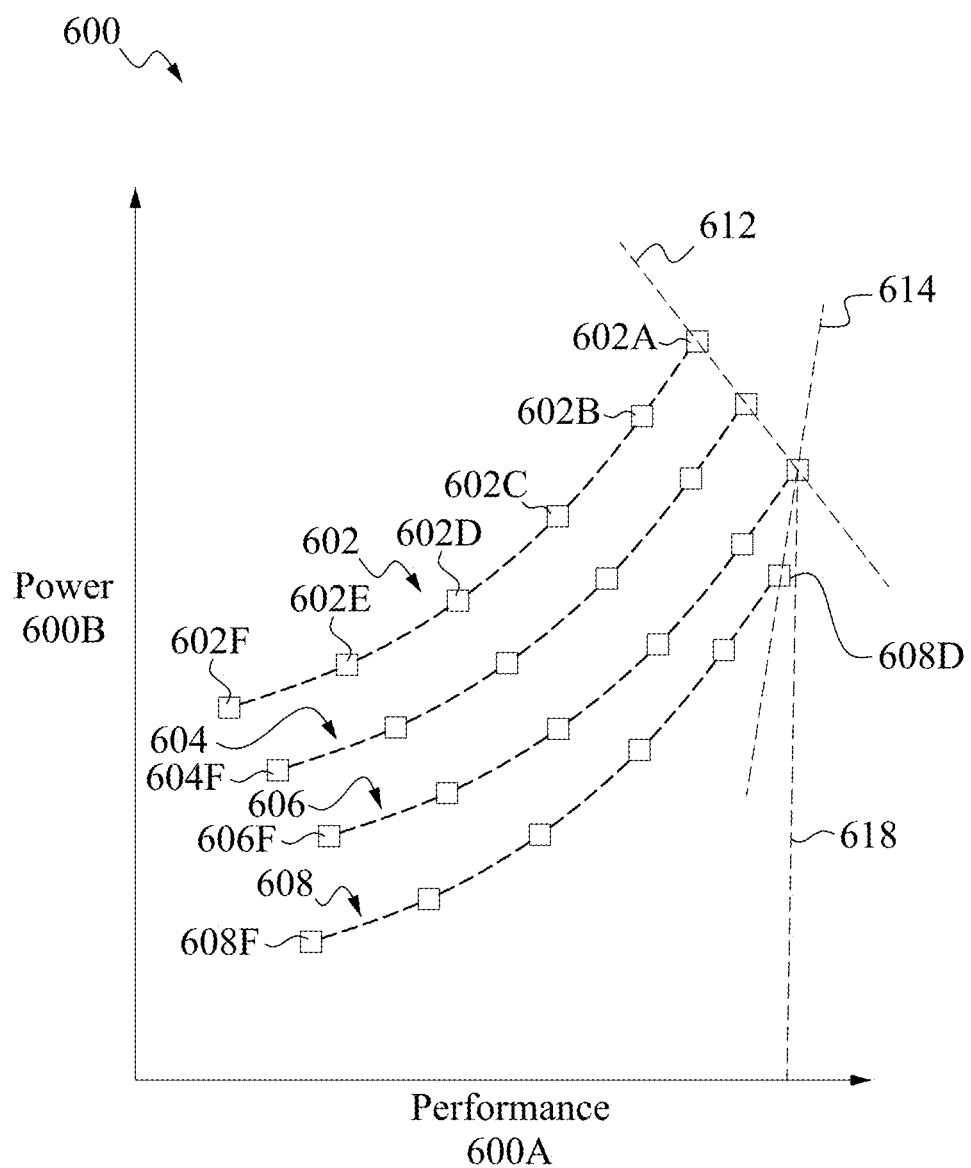
FIG. 6 is a performance chart of a set of design blocks of an integrated circuit, in accordance with some embodiments.

FIG. 6 is a performance chart 600 of integrated circuit 301 (not shown), reflecting modification of a single conductance parameter of a subset of cells of the integrated circuit across a range of conductance parameter values, in accordance with some embodiments. First axis 600A corresponds to values of switching speed, or performance, of the subset of cells of the integrated circuit. Second axis 600B corresponds to values of power consumption of the subset of cells of the integrated circuit. Performance curves 602, 604, 606, and 608 correspond to measured (after manufacturing of an integrated circuit) or calculated (in a SPICE/RC model) behavior of the subset of cells of the integrated circuit for different values of a conductance parameter. As described above, the conductance parameter includes at least the number of fins in the subset of cells of the integrated circuit. Performance point identifiers end with a letter. The letter corresponds to a value of the operating voltage of the integrated circuit for the measurement or calculation of the performance point. Performance points having a same terminal letter are measured or calculated using a same operating voltage. First trend line segment 612 corresponds to values of the conductance parameter, for a single value of the operating voltage, that are positively sensitive with regard to both power consumption and performance (e.g., power consumption decreases, and performance does not decrease). Second trend line segment 614 corresponds to values of the conductance parameter, for the same single value of the operating voltage, that have positive sensitivity of power consumption to changes in the conductance parameter value, but negative sensitivity of performance or switching speed, for the changes to the conductance parameter. Line 618 indicates the value of the conductance parameter and the operating voltage setpoint which results in peak performance of the subset of cells of the integrated circuit.

It is common for integrated circuit manufacturing processes modify conductance parameters uniformly across an entirety of the integrated circuit. However, when all similar type fins (e.g., all NFET fins, or all PFET fins) in an integrated circuit have a common value of the conductance parameter, not all of the transistors in the integrated circuit operate at peak efficiency, or maximum switching speed. Some transistors consume more power than the average across the entire integrated circuit, and some switch more slowly than the average switching speed of the integrated circuit. By tailoring a value of the conductance parameter (e.g., fin height, fin width, fin cross section, number of fins, and so forth), of some transistors in an integrated circuit, power consumption and switching speed of different sets of active areas in the integrated circuit are adjusted to reduce overall power consumption, and/or increase overall switching speed of the integrated circuit.

As discussed herein, the term "fin height" is used to indicate a dimension of a fin as one of the conductance parameters of the design blocks or cells of an integrated circuit. The terms fin height adjustment and dimensional adjustment are intended to be used interchangeably, and are used to refer to methods of adjusting a fin height, a fin width, and/or both the fin height and width, as one form of conductance parameter adjustment of the integrated circuit. In some embodiments discussed below, the fin height is adjusted. In some embodiments, the fin width is adjusted. In some embodiments, the fin height and the fin width are both adjusted. In some embodiments, fin height is adjusted in one area of an integrated circuit, and fin width is adjusted in another area of an integrated circuit. By dividing the fins of an integrated circuit into subsets or categories based on, for example, cell function, transistor speed, and/or number of fins, and adjusting conductance parameters of fins in subsets or areas of an integrated circuit independently, a manufacturing process narrows a distribution of transistor switching speeds in the integrated circuit, to increase the overall switching speed of the IC, and to reduce power consumption of the IC by making a subset of less-power-efficient transistors more power efficient without significantly modifying the clock speed of the subset of transistors.

In some embodiments, transistors in cells with a low-performance target are selected from a high-fin-number cell library, transistors in cells with a high-performance (e.g., high switching speed) target are selected from a low-fin-number cell library during an IC design phase. For purposes of the present disclosure, the term "cell" is used to refer to "cell regions" or discrete components that are formed on an integrated circuit substrate during a manufacturing process. Cells have a boundary that separates cells, or components, e.g., electrically isolate one component from another component to prevent the components from interfering with the performance of the neighboring component. A number of fins in a circuit element of an integrated circuit ranges from one fin to around 8 fins. A number of fins in a circuit element is a function of the cell library from which the cell of the integrated circuit is selected, a function of the circuit element in the integrated circuit, and/or a performance specification of the circuit element in the integrated circuit.

Conductance parameter adjustment is performed on one or more subsets of cells of the integrated circuit to modify the actual, or modelled, performance of the integrated circuit. In some embodiments, conductance parameter adjustment includes fin height adjustment. In some embodiments, conductance parameter adjustment includes fin width adjustment (e.g., fin trimming). In some embodiments, fin cross section (both fin height and fin width) is adjusted to modify performance of the integrated circuit.

In an integrated circuit, the number of fins in a cell of an integrated circuit is strongly correlated with the performance of the integrated circuit, or subsystems of the integrated circuit. Thus, when a block of an integrated circuit, or an array of cells in the IC, has a "high speed" performance target, cells for the block are selected form a low-fin-number library. Conversely, when a block of an IC has a "low" performance target, cells for the block are selected from a high-fin-number library. Cells with a low number of fins tend to switch faster than cells with larger numbers of fins. Traditionally, however, fins in an integrated circuit have a single fin height, despite the cells thereof being taken from designs in different libraries. Performance, or switching speed, of a high performance fin, however, is not necessarily the fastest with the same fin height of a fin from a low performance library. While an integrated circuit performance is measured with fins thereof having a single fin height, overall circuit performance is improved when cells with different functions, or cells with different numbers of fins, have different heights. In some embodiments, power consumption is reduced while maintaining, or improving, upon the performance of cells in a set of cells in the IC. In some embodiments, power consumption of the IC as a whole remains the same while overall IC performance increases.

Figure 7:
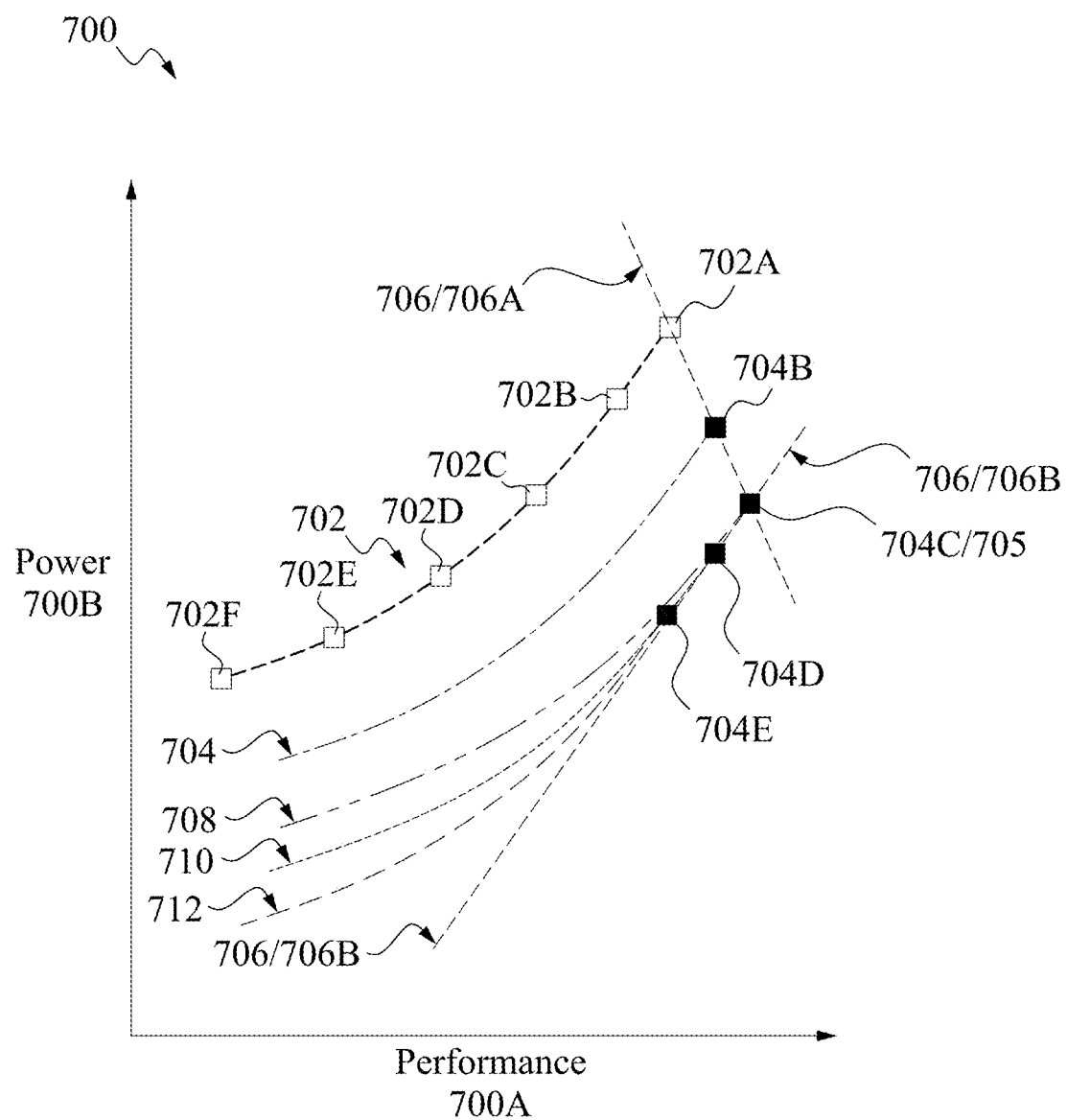
FIG. 7 is a performance chart of a set of design blocks of an integrated circuit, in accordance with some embodiments.

FIG. 7 is a performance chart 700 of results of conductance parameter adjustment of the first subset of cells of integrated circuit 301. Performance curve 304 is reproduced in FIG. 7 as performance curve 702. First axis 700A represents a performance or clock speed of the first subset of cells in integrated circuit 301. Second axis 700B represents a power consumption of the first subset of cells in integrated circuit 301. Performance points in performance curve 704 are represented in performance curve 702 by performance points having a same terminal letter. Performance curves 708, 710, and 712, represent operating results of integrated circuit 301 wherein the first subset of cells contains transistors with different values of a conductance parameter of the integrated circuit. In some cases, the conductance parameter adjustment includes modifying a fin height. In some embodiments, the conductance parameter adjustment includes modifying a fin width. In some embodiments, the conductance parameter includes modifying a fin cross section (e.g., both fin height and fin width). In some embodiments, the conductance parameter adjustment includes modifying a number of fins in the cells of the first subset of cells in an integrated circuit.

Trend line 706 includes a first trend line segment 706A and second trend line segment 706B. First trend line segment 706A and second trend line segment 706B meet at intersection point 705, coinciding with performance point 710A. Performance point 708A is an operating result at a maximum operating voltage setpoint of the integrated circuit, which operating voltage setpoint is common to the performance points 704A, 710A and 712A. First trend line segment 706A shows that at the maximum operating voltage setpoint, there is an increase in clock speed of the first subset of cells in the integrated circuit accompanied by a decrease in power consumption as the fin dimension of the fins in the first subset of cells changes. In other words, for the conductance parameter values resulting in performance curves 702, 704, and 708, the power consumption of first subset of cells of the integrated circuit is positively affected (e.g., power consumption decreases) while switching performance of the first subset of cells of the integrated circuit is also positively affected (performance increases). Starting with inflection point 705, second trend line segment 706B shows that (for the maximum operating voltage setpoint) while power consumption of the integrated circuit continues to decrease for other values of the conductance parameter (corresponding to performance curves 710 and 712), the performance of the first subset of cells of the integrated circuit also decreases. Thus, a user or manufacturer of integrated circuits would likely select an integrated circuit having a conductance parameter corresponding to the conductance parameter of performance curve 710 in order to achieve the best combination of power consumption and performance of the first subset of cells of the integrated circuit for an operating voltage of the integrated circuit.

Figure 8:
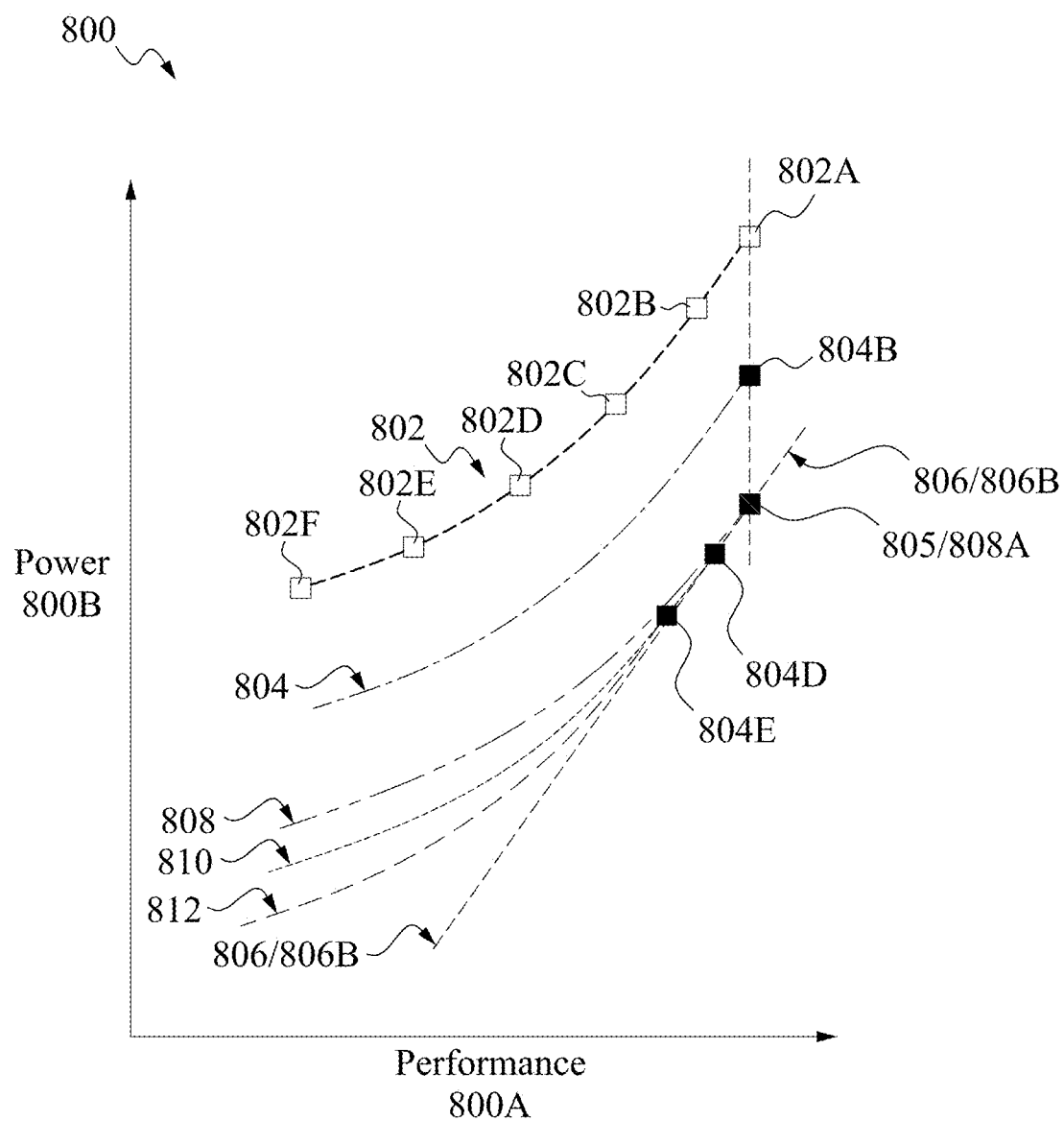
FIG. 8 is a performance chart of a set of design blocks of an integrated circuit, in accordance with some embodiments.

FIG. 8 is a performance chart 800 of performance curves 802, 808, 810, and 812, and a trend line 806, which includes first trend line segment 806A and second trend line segment 806B. Performance chart 800 is a chart of how performance, plotted against first axis 800A, and power consumption, plotted against second axis 800B, vary for different operating voltage setpoints and different values of a conductance parameter, according to some embodiments. The performance plotted is the performance of a second subset of cells, or design blocks, of integrated circuit 301, during a conductance parameter adjustment process. Performance curve 306 of the second subset of active areas of integrated circuit 301 is reproduced in FIG. 8 as performance curve 802. Performance points in performance curve 306 are represented in performance curve 802 by performance points having a same terminal letter. Other elements of FIG. 8 with similar names and functions are as in FIG. 7, the numbers thereof being incremented by 100. In some embodiments, the conductance parameter modified to produce performance curves of FIG. 8 is the same conductance parameter as is modified to produce performance curves of FIG. 7. In some embodiments, the conductance parameter modified to produce performance curves of FIG. 8 is a different conductance parameter than the conductance parameter modified to produce performance curves of FIG. 7.

Performance chart 800 includes a trend line 806, which has a first trend line segment 806A and a second trend line segment 806B. First trend line segment 806A and second trend line segment 806B meet at intersection point 805, corresponding to performance point 808A. First trend line segment 806A includes performance points for which performance/clock speed is insensitive to changes in the conductance parameter modified to produce performance curves 802 and 804, while the power consumption is sensitive to changes in the conductance parameter. As with FIG. 7, the highest performance on a performance curve is associated with the largest operating voltage setpoint used to evaluate the behavior of the integrated circuit. Second trend line segment 806B is associated with a decrease, of both performance and power consumption, for further modifications to the value of the conductance parameter beyond the intersection point 805. Inflection point 805 corresponds to the fin height and operating voltage setpoint that demonstrates the fastest processing speed and lowest power consumption before processing speed also decreases while determining a desired fin height for the second set of integrated circuit active areas.

Figure 9:
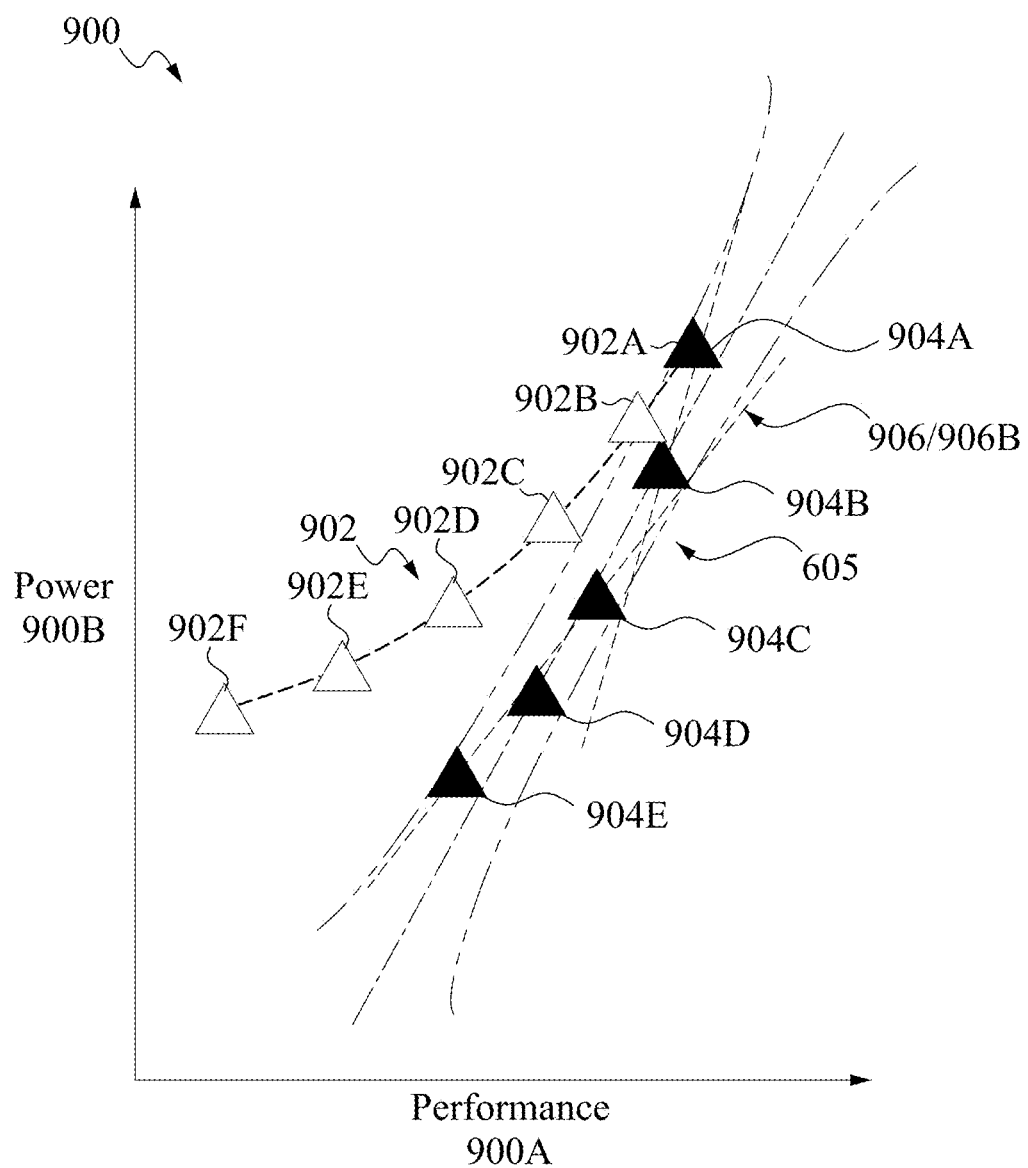
FIG. 9 is a performance chart of a set of design blocks of an integrated circuit, in accordance with some embodiments.

FIG. 9A is a performance chart 900 of performance curve 902 and performance points 904A-904E. Performance chart 900 includes trend line 906, which includes first trend line segment 906A and second trend line segment 906B. Performance chart 900 is a chart of how performance, plotted against first axis 900A, and power consumption, plotted against second axis 900B, vary for different operating voltage setpoints and fin heights, according to some embodiments of a third set of active areas of integrated circuit 301, as described above. Performance curve 302 in FIG. 3, above, is reproduced on FIG. 9 as performance curve 902. Performance point 902A of performance curve 902 is at a maximum operating voltage setpoint of the set of operating voltage setpoints. Performance point 902F is at a smallest operating voltage setpoint of the set of operating voltage setpoints. Each performance point 904A-904E is evaluated at the maximum operating voltage setpoint, corresponding to the setpoint of point 902A. Each different point of performance points 904A-904E corresponds to a performance measurement of the integrated circuit at increasingly short/modified fin heights of the active areas of the integrated circuit 301.

Trend line 906 does not have an inflection point (or, according to some interpretations, has a poorly defined inflection point), where a first trend line segment 906A with a positive slope transitions to a second trend line segment. Rather, trend line 906 has a second trend line segment 906B that also has a positive slope, unlike second trend line segments 706B and 806B, described previously. Thus, with each modification to the conductance parameter, both the switching speed and the power consumption of the subset of cells represented by performance curve 902 decreases. Both switching speed and power consumption are sensitive to modification in the conductance parameter in the subset of cells represented by performance curve 902. Accordingly, the performance point of trend line 904 with the fastest clock speed is the performance point with the largest fin height, performance point 902A/904A. In the third subset of integrated circuit active areas, reductions of the fin height, or a fin dimension, correspond to a decrease in both performance/clock speed and power consumption by the active areas. The point of greatest computational efficiency is thus the terminus of trend line 906: performance point 902A.

Figure 10:
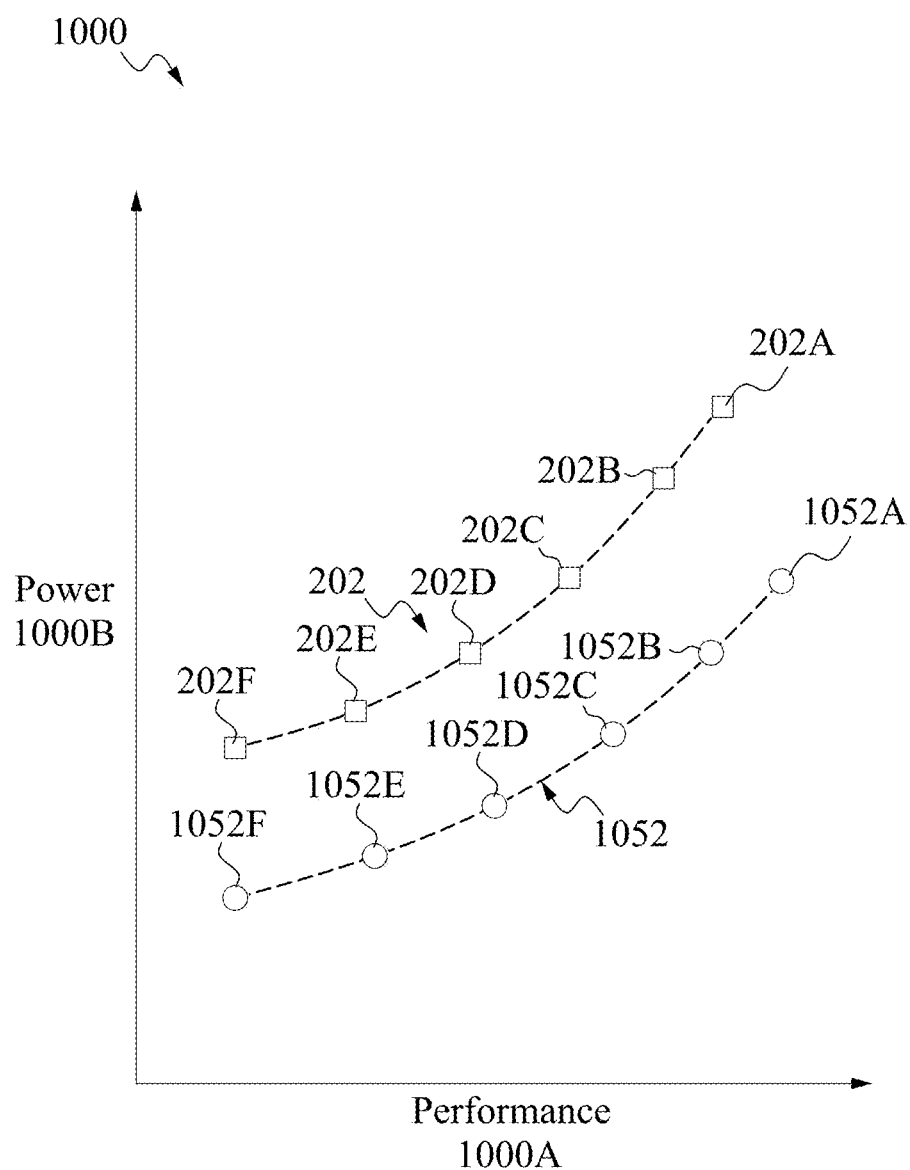
FIG. 10 is a performance chart of an integrated circuit, in accordance with some embodiments.

FIG. 10 is a performance chart 1050 of an integrated circuit 1051 (not shown). Integrated circuit 1051 is an integrated circuit similar in layout to integrated circuit 301, but after having undergone a modification as described above in Method 200. As described above, integrated circuit 301 is an integrated circuit where all of the standard cells of a given type have similar electrical conductance. Performance chart 1000 includes performance curve 202, as described above. Performance chart 1000 shows the performance difference, for the integrated circuit as a whole, when [something about layouts] and all fins have the same conductance characteristics. Performance chart 1050 includes performance curve 1052, reflecting operating results of the IC subsequent to performing fin dimension adjustment processes as described herein for at least one subset of cells in the integrated circuit. Performance point 1052A corresponds to a performance of the integrated circuit 1051 at an operating voltage setpoint similar to the operating voltage setpoint at which performance point 202A is generated. Similarly, performance point 1052F corresponds to a performance of the integrated circuit 1051 at an operating voltage setpoint similar to the operating voltage and performance point 202A correspond to operating results of the integrated circuit 1051 at a maximum operating voltage setpoint. Similarly, performance points 202F and 1052F correspond to operating results at a smallest operating voltage setpoint. The change, with respect to performance curve 202, of the position of performance curve 1052 on performance chart 1050, reflects an increase in the computational efficiency of integrated circuit 301 subsequent to performing fin dimension adjustment. In particular, each performance point of performance curve 1052 has a decreased power consumption than a corresponding performance point of performance curve 202. Further, the clock speeds of the performance points in performance curve 1052 are higher than for corresponding performance points on performance curve 202. Thus, for each performance point of performance curve 1052, the integrated circuit 1051 exhibits higher computational efficiency than the integrated circuit 301 when operating at a similar operating voltage setpoint.

Figure 11A:
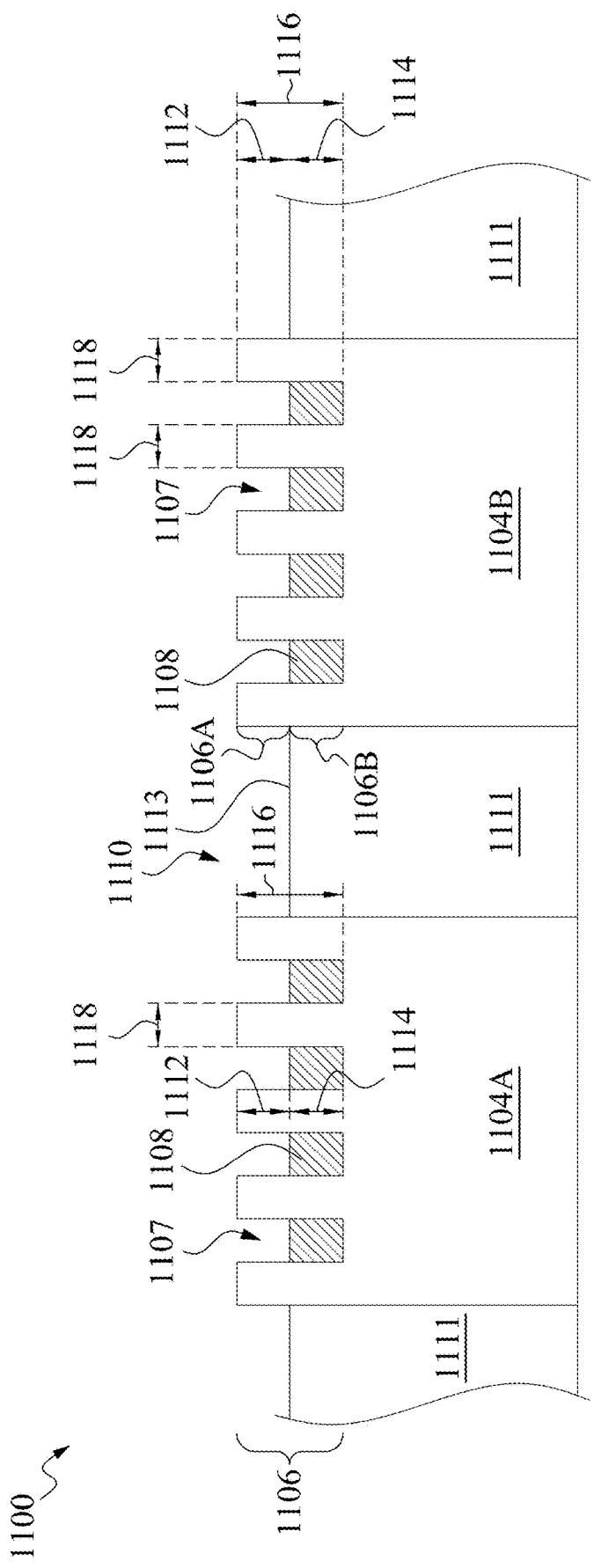
FIGS. 11A-C are cross-sectional diagrams of an integrated circuit gate structure during a manufacturing process, in accordance with some embodiments.
Figure 11B:
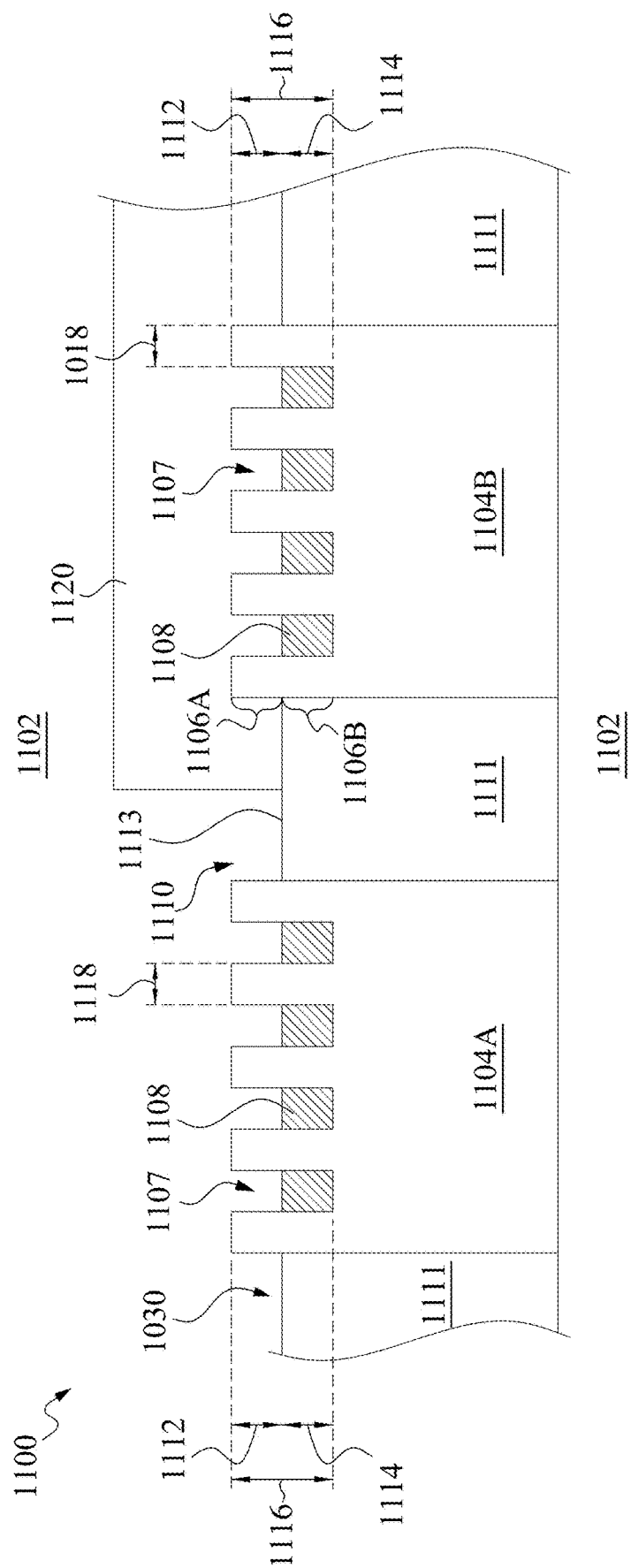
Figure 11C:
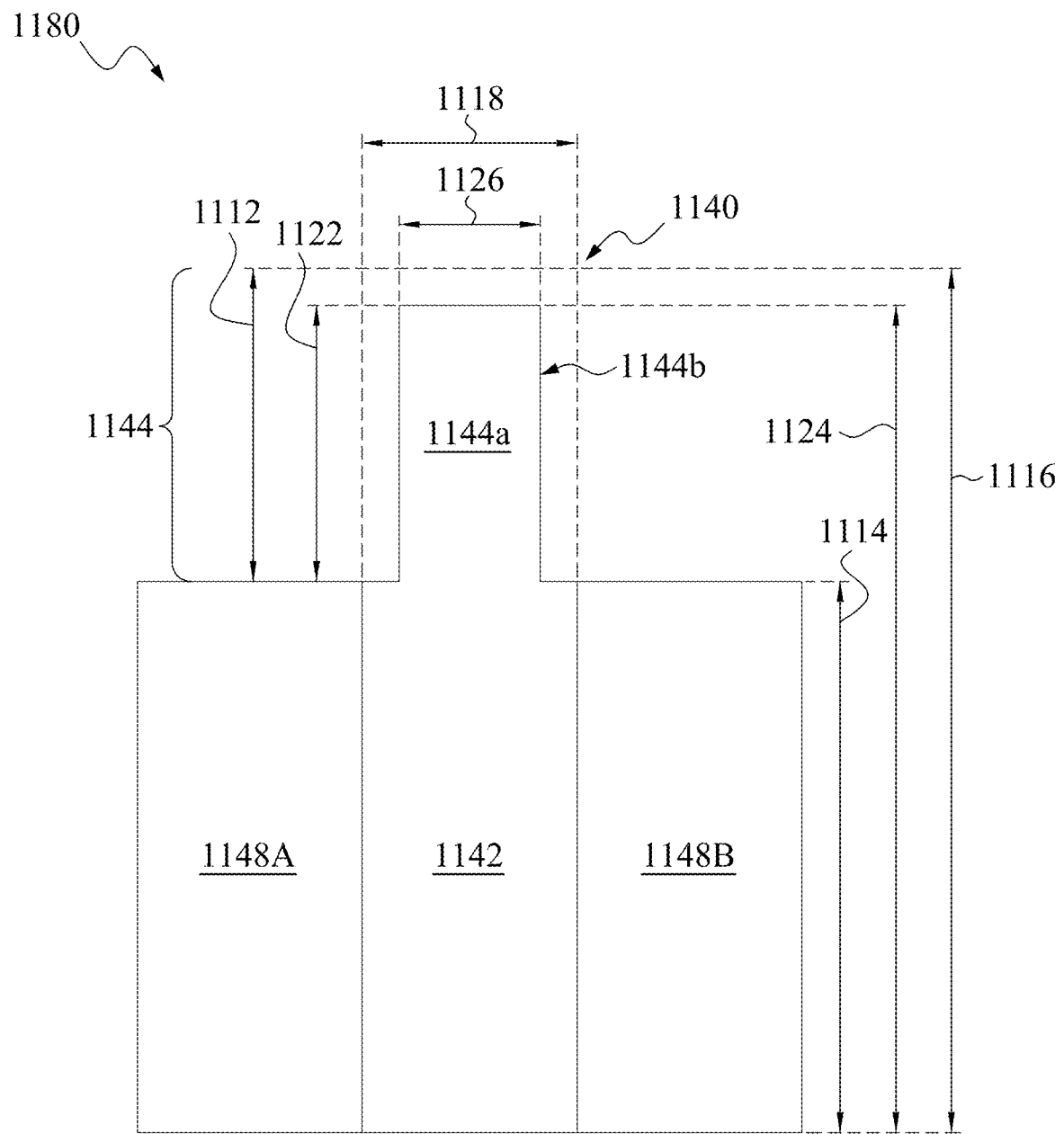

FIGS. 11A-C are cross-sectional diagrams of an integrated circuit 1100, according to some embodiments.

In FIG. 11A, two islands 1104A/B of semiconductor material are on a substrate 1102. Islands 1104A/B are topped by fins 1106 with an exposed portion 1106A and a buried portion 1106B. Islands 1104A/B are separated from each other by barrier lines 1111 (also known as cut poly lines), deep trenches etched into the semiconductor material of islands 1104A/B and filled with dielectric material to prevent electrical coupling of the fins on one island 1104A with fins of the other island 1104B. Fins 1106 are separated from each other by insulating material 1108, and buried portion 1106B of fins 1106 corresponds to portions of the fin material that is surrounded by at least one of the insulating material 1108 and/or a barrier line 1111. Insulating material 1108 is deposited into openings 1107 between fins 1106. In a separate step, dielectric material of barrier lines 1111 is deposited into openings 1110 between islands 1104A/B of the integrated circuit. A top surface 1113 of the dielectric material of barrier lines 1111 and of insulating material 1108 between fins 1106 is used to determine a first exposed fin height 1112 and a buried fin height 1114, where first exposed fin height 1112 and buried fin height 1114 combine to form first total fin height 1116. The top surface 1113 is formed by recessing, using a chemical etching or a plasma etching process, the deposited dielectric material and/or insulating material, below the tops of the fins. Prior to fin trimming, fins have a first fin width 1118.

FIG. 11B is a cross-sectional diagram of islands 1104A/B with a patterned layer of mask material 1120 deposited onto island 1104B, leaving island 1104A exposed for a fin trimming process.

FIG. 11C is a cross-sectional diagram of a portion 1130 of island 1104A during a manufacturing process, after application of a mask layer over fins. Fin 1140 has a buried fin portion 1142 and an exposed fin portion 1144. Buried fin portion 1142 has a first dielectric material portion 1148A and a second dielectric material portion 1148B on either side of the buried fin portion 1142. Exposed fin portion 1144 has an interior portion 1144a that is preserved subsequent to a fin trimming process. An exterior portion 1144b is removed by a fin trimming process. Buried fin portion 1114 and first and second dielectric materials 1148A/B have a first dimension 1114 extending from the top of the second dielectric materials 1148A/B to the bottom of buried fin portion 1142. Prior to a fin trim process, exposed fin portion 1144 has a first exposed fin height 1112, and fin 1140 has a first total fin height 1116. Subsequent to a fin trimming process, fin 1140 has a second exposed fin height 1122, smaller than first exposed fin height 1112, and a second total fin height 1124, smaller than first total fin height 1116. Prior to a fin trimming process, the exposed fin 1144 (e.g., the interior fin portion 1144a and the exterior fin portion 1144b) has a first fin width 1118. Subsequent to a fin trimming process, the exposed fin portion 1144 (e.g., the interior fin portion 1144a) has a second fin width 1126 that is smaller than first fin width 1118.

Figure 12:
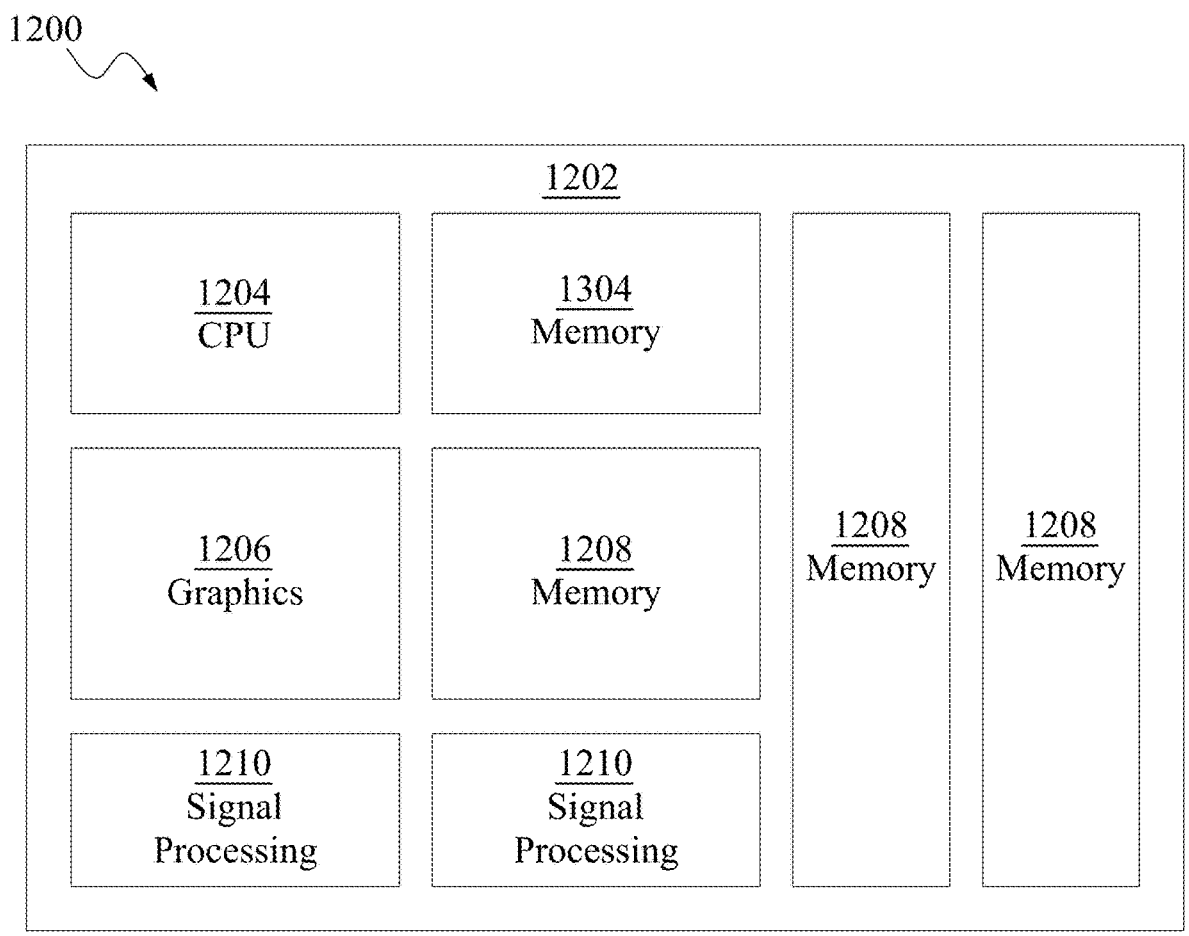
FIG. 12 is a block diagram of an integrated circuit, in accordance with some embodiments.

FIG. 12 is a schematic diagram of an integrated circuit layout 1200, according to some embodiments. Integrated circuit layout 1200 includes a circuit active area 1202 with transistors and other electrical circuit components. Circuit active area 1202 includes a central processing unit (CPU) area 1204, a graphics processing unit (GPU) 1206, one or more memory and/or data storage units 1208, and a signal processing unit 1210 that receives and modifies signals from sensors or other portions of the integrated circuit 1202. In some embodiments of method 700, fins in CPU area 1204, fins in GPU area 1206, fins in the memory/data storage units 1208, and fins in signal processing unit 1210 are formed with different heights according to a performance curve of the integrated circuit units. In some embodiments, fins in CPU area 1204 are shorter than fins in any other area of the integrated circuit active area 1202. In some embodiments, fins in memory/data storage units 1208 are longer/taller than fins in any other area of the integrated circuit active area 1202. In some embodiments of method 700, fins in some areas of integrated circuit active area 1202 have matching heights, and fins in one area have a different fin height than the other areas. In some embodiments, fins in each area have different heights.

Figure 13:
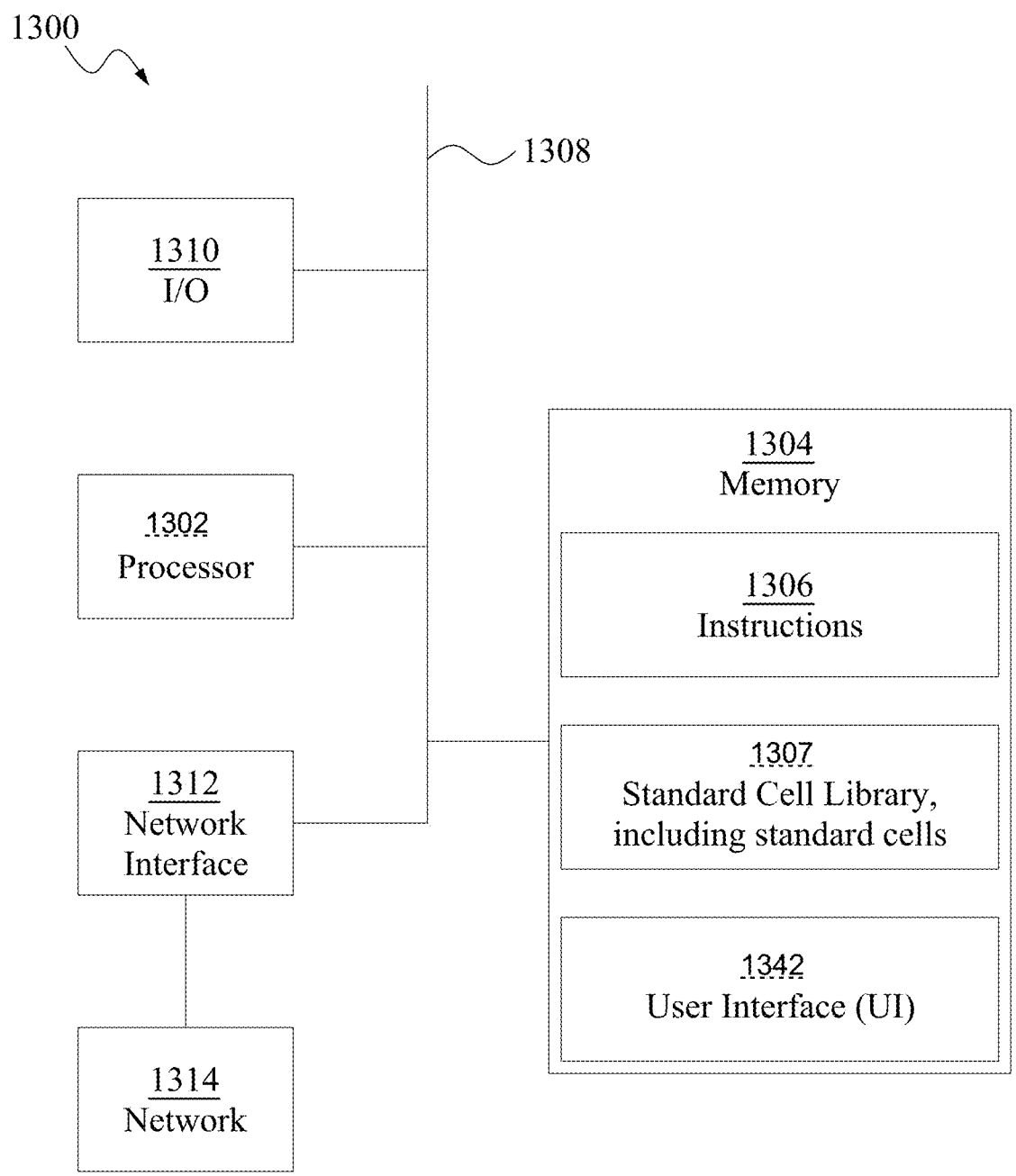
FIG. 13 is a block diagram of an electronic design automation (EDA) system, in accordance with some embodiments.

FIG. 13 is a block diagram of an electronic design automation (EDA) system 1300, in accordance with some embodiments.

In some embodiments, EDA system 1300 includes an automated placement and routing (APR) system. Methods described herein of generating integrated circuit layout diagrams, in accordance with one or more embodiments, are implementable, for example, using EDA system 1300, in accordance with some embodiments.

In some embodiments, EDA system 1300 is a general purpose computing device including a hardware processor 1302 and a non-transitory, computer-readable storage medium 1304. Storage medium 1304, amongst other things, is encoded with, i.e., stores, computer program code 1306, i.e., a set of executable instructions. Execution of instructions 1306 by hardware processor 1302 represents (at least in part) an EDA tool which implements a portion or all of, e.g., the methods described herein in accordance with one or more (hereinafter, the noted processes and/or methods).

Processor 1302 is electrically coupled to computer-readable storage medium 1304 via a bus 1308. Processor 1302 is also electrically coupled to an I/O interface 1310 by bus 1308. A network interface 1312 is also electrically connected to processor 1302 via bus 1308. Network interface 1312 is connected to a network 1314, so that processor 1302 and computer-readable storage medium 1304 are capable of connecting to external elements via network 1314. Processor 1302 is configured to execute computer program code 1306 encoded in computer-readable storage medium 1304 in order to cause system 1300 to be usable for performing a portion or all of the noted processes and/or methods. In one or more embodiments, processor 1302 is a central processing unit (CPU), a multi-processor, a distributed processing system, an application specific integrated circuit (ASIC), and/or a suitable processing unit.

In one or more embodiments, computer-readable storage medium 1304 is an electronic, magnetic, optical, electromagnetic, infrared, and/or a semiconductor system (or apparatus or device). For example, computer-readable storage medium 1304 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1304 includes a compact disk-read only memory (CD-ROM), a compact disk-read/write (CD-R/W), and/or a digital video disc (DVD).

In one or more embodiments, storage medium 1304 stores computer program code 1306 configured to cause system 1300 (where such execution represents (at least in part) the EDA tool) to be usable for performing a portion or all of the noted processes and/or methods. In one or more embodiments, storage medium 1304 also stores information which facilitates performing a portion or all of the noted processes and/or methods. In one or more embodiments, storage medium 1304 stores library 1307 of standard cells including such standard cells as disclosed herein.

EDA system 1300 includes I/O interface 1310. I/O interface 1310 is coupled to external circuitry. In one or more embodiments, I/O interface 1310 includes a keyboard, keypad, mouse, trackball, trackpad, touchscreen, and/or cursor direction keys for communicating information and commands to processor 1302.

EDA system 1300 also includes network interface 1312 coupled to processor 1302. Network interface 1312 allows system 1300 to communicate with network 1314, to which one or more other computer systems are connected. Network interface 1312 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 1300.

System 1300 is configured to receive information through I/O interface 1310. The information received through I/O interface 1310 includes one or more of instructions, data, design rules, libraries of standard cells, and/or other parameters for processing by processor 1302. The information is transferred to processor 1302 via bus 1308. EDA system 1300 is configured to receive information related to a UI through I/O interface 1310. The information is stored in computer-readable medium 1304 as user interface (UI) 1342.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 1300. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 14:
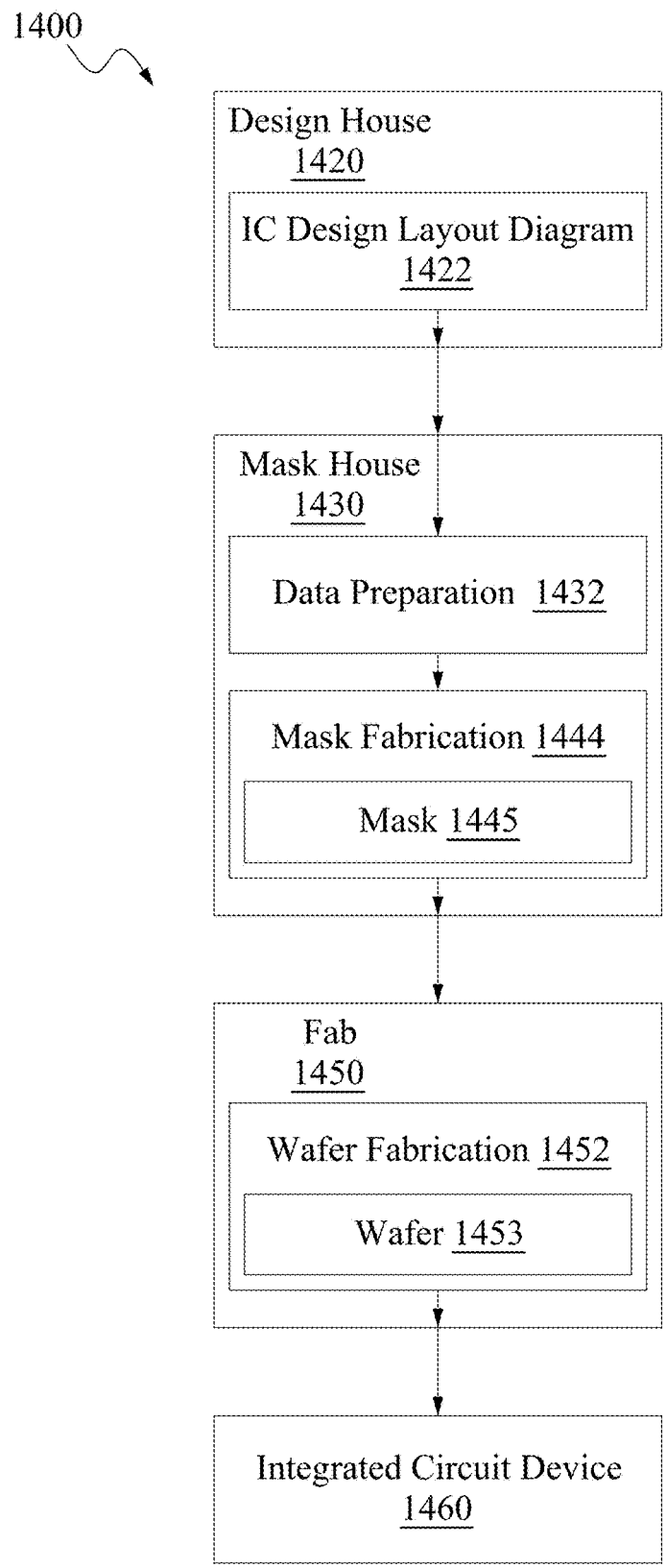
FIG. 14 is a block diagram of an integrated circuit (IC) manufacturing system, and an integrated circuit manufacturing flow associated therewith, in accordance with some embodiments.

FIG. 14 is a block diagram of an integrated circuit (IC) manufacturing system 1400, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1400.

In FIG. 14, IC manufacturing system 1400 includes entities, such as a design house 1420, a mask house 1430, and an IC manufacturer/fabricator ("fab") 1450, that interact with one another in the design, development, and manufacturing cycles and/or services related to manufacturing an IC device 1460. The entities in system 1400 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1420, mask house 1430, and IC fab 1450 is owned by a single larger company. In some embodiments, two or more of design house 1420, mask house 1430, and IC fab 1450 coexist in a common facility and use common resources.

Design house (or design team) 1420 generates an IC design layout diagram 1422. IC design layout diagram 1422 includes various geometrical patterns designed for an IC device 1460. The geometrical patterns correspond to patterns of metal, oxide, or semiconductor layers that make up the various components of IC device 1460 to be fabricated. The various layers combine to form various IC features. For example, a portion of IC design layout diagram 1422 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1420 implements a proper design procedure to form IC design layout diagram 1422. The design procedure includes one or more of logic design, physical design or place and route. IC design layout diagram 1422 is presented in one or more data files having information of the geometrical patterns. For example, IC design layout diagram 1422 can be expressed in a GDSII file format or DFII file format.

Mask house 1430 includes data preparation 1432 and mask fabrication 1444. Mask house 1430 uses IC design layout diagram 1422 to manufacture one or more masks 1445 to be used for fabricating the various layers of IC device 1460 according to IC design layout diagram 1422. Mask house 1430 performs mask data preparation 1432, where IC design layout diagram 1422 is translated into a representative data file ("RDF"). Mask data preparation 1432 provides the RDF to mask fabrication 1444. Mask fabrication 1444 includes a mask writer. A mask writer converts the RDF to an image on a substrate, such as a mask (reticle) 1445 or a semiconductor wafer 1453. The design layout diagram 1422 is manipulated by mask data preparation 1432 to comply with particular characteristics of the mask writer and/or requirements of IC fab 1450. In FIG. 14, mask data preparation 1432 and mask fabrication 1444 are illustrated as separate elements. In some embodiments, mask data preparation 1432 and mask fabrication 1444 can be collectively referred to as mask data preparation.

In some embodiments, mask data preparation 1432 includes optical proximity correction (OPC) which uses lithography enhancement techniques to compensate for image errors, such as those that can arise from diffraction, interference, other process effects and the like. OPC adjusts IC design layout diagram 1422. In some embodiments, mask data preparation 1432 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1432 includes a mask rule checker (MRC) that checks the IC design layout diagram 1422 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1422 to compensate for limitations during mask fabrication 1444, which may undo part of the modifications performed by OPC in order to meet mask creation rules.

In some embodiments, mask data preparation 1432 includes lithography process checking (LPC) that simulates processing that will be implemented by IC fab 1450 to fabricate IC device 1460. LPC simulates this processing based on IC design layout diagram 1422 to create a simulated manufactured device, such as IC device 1460. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1422.

It should be understood that the above description of mask data preparation 1432 has been simplified for the purposes of clarity. In some embodiments, data preparation 1432 includes additional features such as a logic operation (LOP)

to modify the IC design layout diagram 1422 according to manufacturing rules. Additionally, the processes applied to IC design layout diagram 1422 during data preparation 1432 may be executed in a variety of different orders.

After mask data preparation 1432 and during mask fabrication 1444, a mask 1445 or a group of masks 1445 are fabricated based on the modified IC design layout diagram 1422. In some embodiments, mask fabrication 1444 includes performing one or more lithographic exposures based on IC design layout diagram 1422. In some embodiments, an electron-beam (e-beam) or a mechanism of multiple e-beams is used to form a pattern on a mask (photomask or reticle) 1445 based on the modified IC design layout diagram 1422. Mask 1445 can be formed in various technologies. In some embodiments, mask 1445 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1445 includes a transparent substrate (e.g., fused quartz) and an opaque material (e.g., chromium) coated in the opaque regions of the binary mask. In another example, mask 1445 is formed using a phase shift technology. In a phase shift mask (PSM) version of mask 1445, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1444 is used in a variety of processes. For example, such a mask(s) is used in an ion implantation process to form various doped regions in semiconductor wafer 1453, in an etching process to form various etching regions in semiconductor wafer 1453, and/or in other suitable processes.

IC fab 1450 includes wafer fabrication 1452. IC fab 1450 is an IC fabrication business that includes one or more manufacturing facilities for the fabrication of a variety of different IC products. In some embodiments, IC Fab 1450 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business. In some embodiments of the present disclosure, fin dimensional adjustment includes operations associated with making an array of fins across an entirety of the fin-containing functional areas of the integrated circuit, followed by modification of fin dimensions in at least one fin-containing functional area of the integrated circuit. In some embodiments of the present disclosure, the fins of different fin-containing functional areas are formed to a final fin shape or fin dimensional profile separately, in a single fin-formation manufacturing flow for each fin-containing functional area of the IC. In some embodiments, the fin dimension adjustment occurs by forming fins in a layer of fin material, or fin substrate, by applying mask layer to a top surface of the fin material, patterning the mask layer with a pattern that corresponds to the locations of fins in one or more of the fin-containing functional areas, exposing a top surface of the fin material through the mask layer, and etching the fin material to form fins in the fin substrate. In some embodiments, the fins are formed in a single functional area of the IC with a final fin dimension, the selected fin dimension (or, fin height) as described above in operation 740.

A patterned layer of mask material formed on a semiconductor substrate is made of a mask material that includes one or more layers of photoresist, polyimide, silicon oxide, silicon nitride (e.g., $Si_3N_4$), SiON, SiC, SiOC, or combinations thereof. In some embodiments, masks include a single layer of mask material. In some embodiments, a mask includes multiple layers of mask materials.

In some embodiments, the mask material is patterned by exposure to an illumination source. In some embodiments, the illumination source is an electron beam source. In some embodiments, the illumination source is a lamp that emits light. In some embodiments, the light is ultraviolet light. In some embodiments, the light is visible light. In some embodiments, the light is infrared light. In some embodiments, the illumination source emits a combination of different (UV, visible, and/or infrared) light.

Subsequent to mask patterning operations, fins of areas not covered by the mask, or fins in open areas of the pattern, are etched to modify a fin dimension. In some embodiments, the etching is performed on a top surface of fins with fin sides that are completely covered by adjoining dielectric support material deposited between fins in a previous manufacturing step. Etching of top surfaces of fins is performed with plasma etching, or with a liquid chemical etch solution, according to some embodiments. The chemistry of the liquid chemical etch solution includes one or more of etchants such as citric acid ($C_6H_8O_7$), hydrogen peroxide ($H_2O_2$), nitric acid ($HNO_3$), sulfuric acid ($H_2SO_4$), hydrochloric acid (HCl), acetic acid ($CH_3CO_2H$), hydrofluoric acid (HF), buffered hydrofluoric acid (BHF), phosphoric acid ($H_3PO_4$), ammonium fluoride ($NH_4F$) potassium hydroxide (KOH), ethylenediamine pyrocatechol (EDP), TMAH (tetramethylammonium hydroxide), or a combination thereof. In some embodiments, etching the fins is performed by exposing an upper portion of fin material, extending above a top surface of a dielectric support medium deposited between fins and recessed below a top surface of the fin height in a prior manufacturing step, to a liquid chemical etch solution comprising one or more of the liquid chemical etchants described above. An upper portion of the fin material includes a top surface and sides of the fin material.

In some embodiments, the etching process is a dry-etch or plasma etch process. Plasma etching of a substrate material is performed using halogen-containing reactive gasses excited by an electromagnetic field to dissociate into ions. Reactive or etchant gases include $CF_4$, $SF_6$, $NF_3$, $Cl_2$, $CCl_2F_2$, $SiCl_4$, $BCl_2$, or a combination thereof, although other semiconductor-material etchant gases are also envisioned within the scope of the present disclosure. Ions are accelerated to strike exposed fin material by alternating electromagnetic fields or by fixed bias according to methods of plasma etching that are known in the art. In some embodiments, etching processes include presenting the exposed portions of fins of the functional area in an oxygen-containing atmosphere to oxidize an outer portion of the fin material, followed by a chemical trimming process such as plasma-etching or liquid chemical etching, as described above, to remove the oxidized semiconductor fin material and leave a modified fin behind. In some embodiments, fin oxidation followed by chemical trimming is performed to provide greater selectivity to the fin material and to reduce a likelihood of accidental fin material removal during a manufacturing process. In some embodiments, the exposed portions of fins of the functional area are top surfaces of the fins, the fins being embedded in a dielectric support medium covering the sides of the fins. In some embodiments, the exposed portions of the fins of the functional area are top surfaces and sides of the fins that are above a top surface of the dielectric support medium, where the top surface of the dielectric support medium has been recessed to a level below the top surface of the fins, but still covering a lower portion of the sides of the fins.

IC fab 1450 uses mask(s) 1445 fabricated by mask house 1430 to fabricate IC device 1460. Thus, IC fab 1450 at least indirectly uses IC design layout diagram 1422 to fabricate IC device 1460. In some embodiments, semiconductor wafer 1453 is fabricated by IC fab 1450 using mask(s) 1445 to form IC device 1460. In some embodiments, the IC fabrication includes performing one or more lithographic exposures based at least indirectly on IC design layout diagram 1422. Semiconductor wafer 1453 includes a silicon substrate or other proper substrate having material layers formed thereon. Semiconductor wafer 1453 further includes one or more of various doped regions, dielectric features, multi-level interconnects, and the like (formed at subsequent manufacturing steps).

Details regarding an integrated circuit (IC) manufacturing system (e.g., system 1400 of FIG. 14), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

Aspects of the present disclosure relate to a method of modifying an integrated circuit that includes steps of identifying at least two fin-containing functional areas of the integrated circuit, generating a performance curve for each fin-containing functional area of the integrated circuit for each fin height of a series of fin heights, determining whether an inflection point exists for each performance curve, selecting a value of a performance characteristic for each of the fin-containing functional areas, the selected value having a corresponding fin height in each of the fin-containing functional areas; modifying each fin-containing functional area to have the fin height corresponding to the selected value of the performance characteristic, and combining the modified fin-containing functional areas to form a modified integrated circuit. In some embodiments, the selected value of a performance characteristic is a fastest switching speed of cells in the at least two fin-containing functional areas. In some embodiments, the selected value of a performance characteristic is a lowest power consumption of cells in the at least two fin-containing functional areas. In some embodiments, the selected value of a performance characteristic is leakage current of cells in the at least two fin-containing functional areas. In some embodiments, the selected value of a performance characteristic is a number of clock cycles per Watt of consumed power by the modified integrated circuit. In some embodiments, generating a performance curve for each fin-containing functional area includes adjusting an operating voltage setpoint over a series of operating voltage setpoints, and determining a clock speed of the fin-containing functional area for each fin height of the series of fin heights. In some embodiments, selecting a fin height for each fin-containing functional area of the integrated circuit comprises determining whether an inflection point exists in each performance curve. In some embodiments, determining whether an inflection point exists in each performance curve further comprises: generating a set of trend lines based on one operating voltage setpoint of the series of operating voltage setpoints; and determining, for each operating voltage setpoint and over the series of fin heights, whether the value of a performance characteristic of one fin-containing functional area increases or decreases between the fin heights of the series of fin heights; calculating an intersection between a first portion of a trend line where the value of the performance characteristic increases, and a second portion of the trend line where the value of the performance characteristic decreases. In some embodiments, selecting a fin height for each fin-containing functional area of the integrated circuit includes selecting, from among a series of values of the performance characteristic, a peak value of the performance characteristic corresponding to a largest fin height of the series of fin heights. In some embodiments, the method further includes forming fins in the fin-containing functional areas of a substrate material.

Aspects of the present disclosure relate to a method including operations related to identifying a plurality of fin-containing functional areas of an integrated circuit; generating a performance curve for each of the plurality of fin-containing functional areas over a series of operating voltages for a series of candidate fin heights; selecting a fin height from the series of candidate fin heights for each of the plurality of fin-containing functional areas, the selected fin height corresponding to a selected value of a performance characteristic of each of the plurality of fin-containing functional areas; and modifying at least one fin-containing functional area of the plurality of fin-containing functional areas based on the corresponding selected fin height to make a modified integrated circuit. In some embodiments, the selected value of the performance characteristic is a fastest switching speed. In some embodiments, selected value of the performance characteristic is a lowest power consumption. In some embodiments, selected value of the performance characteristic is a lowest leakage current. In some embodiments, the method further includes determining whether an inflection point exists for each of the performance curves. In some embodiments, the method further includes determining whether an inflection point exists further comprises determining, for each fin height shorter than the first height, whether a coordinate of the performance curve has a clock speed larger than the coordinate of the first fin height. In some embodiments, further includes generating a set of trend lines based on an operating voltage setpoint of the series of operating voltage setpoints; and determining, for each of the operating voltage setpoints of the series of operating voltage setpoints, whether the coordinates of evaluation points of the trend lines increase or decrease for fin heights shorter than the first fin height. In some embodiments, the method further includes calculating an intersection point of a first trend line segment and a second trend line segment, wherein the first trend line segment and the second trend line segment have slopes that differ by at least 15 degrees. In some embodiments, selecting a fin height further includes selecting, when no inflection point exists, the first fin height; and selecting, when an inflection point exists, the fin height corresponding to the coordinate of the performance curve having a fastest clock speed.

Aspects of the present disclosure relate to a modified integrated circuit, comprising at least three fin-containing functional areas having different functions in the modified integrated circuit, wherein the fins of each of the fin-containing functional areas have a different fin dimension from the other fin-containing functional areas, and wherein the fin-containing functional areas are located in a same continuous substrate of the integrated circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   identifying a plurality of fin-containing functional areas of an integrated circuit;
   generating a plurality of performance curves for each fin-containing functional area of the plurality of fin-containing functional areas, wherein each performance curve of the plurality of performance curves is based on a different fin height;
   selecting a value of a performance characteristic for each of the plurality of fin-containing functional areas;
   modifying a fin height of fins of at least one fin-containing functional area to have a fin height corresponding to a fin height corresponding to the selected value of the performance characteristic;
   combining the plurality of fin-containing functional areas, including the at least one modified fin-containing functional area, to form a modified integrated circuit and;
   forming the modified integrated circuit in a manufacturing process.

2. The method of claim 1, wherein the selecting the value comprises selecting a fastest switching speed.

3. The method of claim 1, wherein the selecting the value comprises selecting a lowest power consumption.

4. The method of claim 1, wherein the selecting the value comprises selecting a lowest leakage current.

5. The method of claim 1, wherein the selecting the value comprises selecting a conductance parameter corresponding to a highest switching speed of the integrated circuit without decreasing the power consumption of the integrated circuit.

6. The method of claim 1, wherein the generating the performance curve for each of the plurality of fin-containing functional areas further comprises:
   adjusting an operating voltage setpoint over a series of operating voltage setpoints, and
   determining a clock speed of the corresponding fin-containing functional area for each fin height of the series of fin heights.

7. The method of claim 6, wherein the selecting the fin height for each fin-containing functional area comprises determining whether an inflection point exists in each of the plurality of performance curves.

8. The method of claim 7, wherein the determining whether the inflection point exists comprises:
   generating a set of trend lines based on an operating voltage setpoint of the series of operating voltage setpoints; and
   determining, for each of the series operating voltage setpoints and over the series of fin heights, whether the value of the performance characteristic of a fin-containing functional area of the plurality of fin-containing functional areas increases or decreases between the fin heights of the series of fin heights; and
   calculating an intersection between a first trend line of the set of trend lines where the value of the performance characteristic increases, and a second trend line of the set of trend lines where the value of the performance characteristic decreases.

9. The method of claim 8, wherein the selecting the fin height for each of the plurality of fin-containing functional areas comprises selecting, from among a series of values of the performance characteristic, a selected value of the performance characteristic corresponding to a largest fin height of the series of fin heights.

10. A method comprising:
    identifying a plurality of fin-containing functional areas of an integrated circuit;
    generating a performance curve for each of the plurality of fin-containing functional areas over a series of operating voltages for a series of candidate fin heights;
    selecting a fin height from the series of candidate fin heights for each of the plurality of fin-containing functional areas, the selected fin height corresponding to a selected value of a performance characteristic of each of the plurality of fin-containing functional areas;
    modifying at least one fin-containing functional area of the plurality of fin-containing functional areas based on the corresponding selected fin height to make a modified integrated circuit and;
    forming the modified integrated circuit in a manufacturing process.

11. The method of claim 10, wherein the selected value of the performance characteristic is a fastest switching speed.

12. The method of claim 10, wherein the selected value of the performance characteristic is a lowest power consumption.

13. The method of claim 10, wherein the selected value of the performance characteristic is a lowest leakage current.

14. The method of claim 10, further comprising determining whether an inflection point exists for each of the performance curves.

15. The method of claim 14, wherein determining whether the inflection point exists further comprises determining, for each fin height shorter than a first fin height, whether a coordinate of the performance curve has a clock speed larger than the coordinate of the first fin height.

16. The method of claim 14, further comprising
    generating a set of trend lines based on an operating voltage setpoint of the series of operating voltage setpoints; and
    determining, for each of the operating voltage setpoints of the series of operating voltage setpoints, whether the coordinates of evaluation points of the trend lines increase or decrease for fin heights shorter than the first fin height.

17. The method of claim 16, further comprising calculating an intersection point of a first trend line segment and a second trend line segment, wherein the first trend line segment and the second trend line segment have slopes that differ by at least 15 degrees.

18. The method of claim 14, wherein selecting a fin height further comprises
    selecting, when no inflection point exists, the first fin height; and
    selecting, when an inflection point exists, the fin height corresponding to the coordinate of the performance curve having a fastest clock speed.

19. A method, comprising:

selecting an operating voltage for an integrated circuit from a series of operating voltages;

identifying a plurality of fin-containing functional areas of an integrated circuit; selecting, from a range of fin heights, a fin height for each of the plurality of fin-containing functional areas of the integrated circuit;

generating a first performance curve for each of the fin-containing functional areas at the selected operating voltage;

modifying, based on the generated first performance curve for each of the fin-containing functional areas, the fin height of the fin-containing functional areas;

generating a second performance for each of the fin-containing functional areas at the selected operating voltage and;

forming the modified integrated circuit in a manufacturing process.

* * * * *